(12) United States Patent
Freishtat et al.

(10) Patent No.: US 9,576,292 B2
(45) Date of Patent: Feb. 21, 2017

(54) SYSTEMS AND METHODS TO FACILITATE SELLING OF PRODUCTS AND SERVICES

(71) Applicant: LivePerson, Inc., New York, NY (US)

(72) Inventors: Gregg Freishtat, Atlanta, GA (US);
Steve Hufford, Atlanta, GA (US);
Dodge Mcfall, Marietta, GA (US);
Jackson Wilson, Atlanta, GA (US);
Tanya Hyman, Atlanta, GA (US);
Vikas Rijsinghani, Atlanta, GA (US);
Paul Kaib, Dunwoody, GA (US)

(73) Assignee: LivePerson, Inc., New York, NY (US)

( * ) Notice: Subject to any disclaimer, the term of this patent is extended or adjusted under 35 U.S.C. 154(b) by 0 days.

(21) Appl. No.: 14/288,258

(22) Filed: May 27, 2014

(65) Prior Publication Data
US 2014/0372240 A1    Dec. 18, 2014

Related U.S. Application Data

(63) Continuation of application No. 09/922,753, filed on Aug. 6, 2001, now Pat. No. 8,868,448.
(Continued)

(51) Int. Cl.
*G06Q 30/00* (2012.01)
*G06Q 30/06* (2012.01)

(52) U.S. Cl.
CPC .............. *G06Q 30/01* (2013.01); *G06Q 30/06* (2013.01); *G06Q 30/0601* (2013.01);
(Continued)

(58) Field of Classification Search
CPC .. G06Q 20/382; G06Q 20/3674; G06Q 30/06; G06Q 30/02; G06F 21/10
(Continued)

(56) References Cited

U.S. PATENT DOCUMENTS 4,881,261 A    11/1989   Oliphant et al.
5,187,735 A    2/1993    Herrero Garcia et al.
(Continued)

FOREIGN PATENT DOCUMENTS

EP    840244 A1    5/1998
EP    1233361 A1   8/2002
(Continued)

OTHER PUBLICATIONS

Chartrand Sabra, "A new system seeks to ease the bottleneck in the customer-service information highway" New York Times (Apr. 30, 2001) p. 12, col. 4.
(Continued)

*Primary Examiner* — Garcia Ade
(74) *Attorney, Agent, or Firm* — Kilpatrick Townsend & Stockton LLP

(57) ABSTRACT

The system of the present invention provides systems and methods for selling goods and services on, over, through, and in conjunction with the Internet. The system receives session (clickstream) information on a customer's website session from the enterprise's website and may also receive customer information on the customer from the enterprise's CRM or eCRM system. The session information referred to comprises the goods or services the customer is searching and metadata about such search and the relevant products, such as the surfing pattern itself. The system determines from the received information, based on the interaction between matching rules created using the system by the enterprise and the system's matching engine, whether the customer is a candidate for assistance from a sales associate. The system creates and indexes information on available sales associates and their performance, selling capabilities and product expertise. The system further matches the customer with at least one sales associate, ideally the most
(Continued)

appropriate sales associate, based on the customer, session, and sales profile associate information, and facilitates communication between the sales associate and the customer. Additionally, the system provides information on the customer, products or services the customer is interested in, and the collateral sales materials (both internal and external to the enterprise) and selling techniques to the sales associate based on the particular sales opportunity. The system facilitates communication between the sales associate and the customer on the basis of chat, voice over IP, email and the public switched telephone network, including the concept of bridging a chat session into a PSTN conference call during which call the sales associate and customer maintain a co-browsing session with regard to the opportunity over the Internet.

19 Claims, 10 Drawing Sheets

Related U.S. Application Data

(60) Provisional application No. 60/244,039, filed on Oct. 26, 2000.

(52) U.S. Cl.
CPC ..... *G06Q 30/0613* (2013.01); *G06Q 30/0617* (2013.01); *G06Q 30/0623* (2013.01); *G06Q 30/0641* (2013.01)

(58) Field of Classification Search
USPC .......................................................... 705/26
See application file for complete search history.

(56) References Cited

U.S. PATENT DOCUMENTS

| | | |
|---|---|---|
| 5,206,903 A | 4/1993 | Kohler et al. |
| 5,208,748 A | 5/1993 | Flores et al. |
| 5,235,519 A | 8/1993 | Miura |
| 5,239,462 A | 8/1993 | Jones et al. |
| 5,262,941 A | 11/1993 | Saladin et al. |
| 5,289,371 A | 2/1994 | Abel et al. |
| 5,319,542 A | 6/1994 | King et al. |
| 5,351,186 A | 9/1994 | Bullock et al. |
| 5,372,507 A | 12/1994 | Goleh |
| 5,375,055 A | 12/1994 | Togher et al. |
| 5,387,783 A | 2/1995 | Mihm et al. |
| 5,450,537 A | 9/1995 | Hirai et al. |
| 5,517,405 A | 5/1996 | McAndrew et al. |
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Maloney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenreich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |

(56) References Cited

U.S. PATENT DOCUMENTS

| | | | |
|---|---|---|---|
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,375 A * | 5/2000 | Park ................ G06Q 40/12 705/30 |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Johnson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 * | 10/2002 | Lee ................ H04L 12/2602 709/203 |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai |
| 6,622,131 B1 | 9/2003 | Brown |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 * | 4/2004 | Guheen ................ G06Q 99/00 705/1.1 |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shaflee et al. |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsch |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 * | 11/2005 | Bednarek ........... G06Q 30/0201 705/26.1 |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |

(56) References Cited

U.S. PATENT DOCUMENTS

| | | |
|---|---|---|
| 7,243,109 B2 | 7/2007 | Omega et al. |
| 7,251,648 B2 | 7/2007 | Chaudhuri et al. |
| 7,266,510 B1 * | 9/2007 | Cofino .................. G06Q 30/02 705/26.1 |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,958,066 B2 | 6/2011 | Pinckney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,185,544 B2 | 5/2012 | Oztekin et al. |
| 8,260,846 B2 | 9/2012 | Lahav |
| 8,266,127 B2 | 9/2012 | Mattox et al. |
| 8,386,340 B1 | 2/2013 | Feinstein |
| 8,392,580 B2 | 3/2013 | Allen et al. |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0044149 A1 | 2/2005 | Regardie et al. |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |
| 2005/0114195 A1 | 5/2005 | Bernasconi |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |

(56) References Cited

U.S. PATENT DOCUMENTS

| | | |
|---|---|---|
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijsinghani et al. |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041378 A1 | 2/2006 | Cheng |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0206086 A1 | 9/2007 | Baron et al. |
| 2007/0239527 A1 | 10/2007 | Nazer et al. |
| 2007/0250585 A1 | 10/2007 | Ly et al. |
| 2007/0260596 A1 | 11/2007 | Koran et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0307003 A1 | 12/2009 | Benyamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0205024 A1 | 8/2010 | Shachar et al. |
| 2010/0255812 A1 | 10/2010 | Nanjundaiah et al. |
| 2010/0281008 A1 | 11/2010 | Braunwarth |
| 2010/0306043 A1 | 12/2010 | Lindsay et al. |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0042389 A1 | 2/2012 | Bradley et al. |
| 2012/0059722 A1 | 3/2012 | Rao |
| 2012/0130918 A1 | 5/2012 | Gordon |
| 2012/0136939 A1 | 5/2012 | Stern et al. |
| 2012/0150973 A1 | 6/2012 | Barak |
| 2012/0195422 A1 | 8/2012 | Famous |
| 2012/0254301 A1 | 10/2012 | Fiero |
| 2012/0323346 A1 | 12/2012 | Ashby et al. |
| 2013/0013362 A1 | 1/2013 | Walker et al. |
| 2013/0036202 A1 | 2/2013 | Lahav |
| 2013/0054707 A1 | 2/2013 | Muszynski et al. |
| 2013/0117804 A1 | 5/2013 | Chawla |
| 2013/0132194 A1 | 5/2013 | Rajaram |
| 2013/0182834 A1 | 7/2013 | Lauffer |
| 2013/0212497 A1 | 8/2013 | Zelenko et al. |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0310229 A1 | 10/2014 | Lahav et al. |
| 2015/0012602 A1 | 1/2015 | Schorzman et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0149571 A1 | 5/2015 | Barak et al. |
| 2015/0200822 A1 | 7/2015 | Zelenko et al. |
| 2015/0213363 A1 | 7/2015 | Lahav |

(56) References Cited

U.S. PATENT DOCUMENTS

| | | | |
|---|---|---|---|
| 2015/0248486 A1 | 9/2015 | Barak et al. | |
| 2015/0278837 A1 | 10/2015 | Lahav et al. | |
| 2016/0055277 A1 | 2/2016 | Lahav et al. | |

FOREIGN PATENT DOCUMENTS

| | | | |
|---|---|---|---|
| EP | 1276 064 A2 | 1/2003 | |
| EP | 1549025 A1 | 6/2005 | |
| EP | 1 840 803 A1 | 10/2007 | |
| EP | 1845436 A2 | 10/2007 | |
| EP | 1850284 A1 | 10/2007 | |
| FR | 2 950 214 A1 | 3/2011 | |
| JP | 9288453 | 11/1997 | |
| JP | 2004-054533 | 2/2004 | |
| JP | 2010/128877 | 6/2010 | |
| KR | 20040110399 A | 12/2004 | |
| KR | 20050010487 A | 1/2005 | |
| KR | 20080046310 A | 5/2008 | |
| KR | 20080097751 A | 11/2008 | |
| WO | 9722073 A1 | 6/1997 | |
| WO | 9845797 A2 | 10/1998 | |
| WO | 9909470 A1 | 2/1999 | |
| WO | 9922328 A1 | 5/1999 | |
| WO | 9944152 A1 | 9/1999 | |
| WO | 00/57294 A1 | 9/2000 | |
| WO | WO-01/24825 A1 | 4/2001 | |
| WO | 01/35272 A2 | 5/2001 | |
| WO | WO 02/065367 A2 | 8/2002 | |
| WO | 03/032146 A1 | 4/2003 | |
| WO | 2004/057473 A1 | 7/2004 | |
| WO | 2005/059777 A1 | 6/2005 | |
| WO | 2007/044757 A1 | 4/2007 | |
| WO | 2007/129625 A1 | 11/2007 | |
| WO | 2008/057181 A2 | 5/2008 | |
| WO | 2008/14382 A1 | 11/2008 | |
| WO | 2009/029940 A1 | 3/2009 | |
| WO | 2010/099632 A1 | 9/2010 | |
| WO | 2010/119379 A1 | 10/2010 | |
| WO | 2010/144207 A2 | 12/2010 | |
| WO | 2011/127049 A1 | 10/2011 | |
| WO | 2013/119808 A1 | 8/2013 | |
| WO | 2013/158830 A1 | 10/2013 | |
| WO | 2013/163426 A1 | 10/2013 | |
| WO | 2015/021068 A2 | 2/2015 | |

OTHER PUBLICATIONS

Just Answer (2004 Faq) Archive.org cache of www.justanswer.com circa (Dec. 2004).
Pack Thomas, "Human Search Engines the next Killer app," (Dec. 1, 2000) Econtent DBS vol. 23; Issue 6 p. 16.
match.com "Match.com Launches Match.com Advisors," PR Newswire (Oct. 14, 2003).
Sitel, "Sitel to Provide Live Agent Support Online for Expertcity. com," PR Newswire (Feb. 28, 2000).
Webmaster World, "Link to my website is in a frame with banner ad at the top," (Nov. 11, 2003) www.webmasterworld.com.
Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
FAIRISAAC, "How SmartForms for Blaze Advisor Works," www.fairisaac.com 12 pages (Jan. 2005).
Mesbah A et al., "A Component-and Push-Based Architectural Style for Ajax Applications," The Journal of Systems & Software, 81 (12): pp. 2194-2209, Elsevier North Holland, New York, NY US (Dec. 2008).
Oracle Fusion Middleware Administrator's Guide for Oracle SOA (Oracle Guide) Suite 11g Release 1 (11.1.1) Part No. E10226-02 www.docs.oracle.com (Oct. 2009).
"Oauth core 1.0 Revision A," [XP002570263] Jun. 24, 2009, Oauth Core Workgroups pp. 1-27 www.ouath.net/core/1.0a/) retrieved Jun. 24, 2009.

PRN: "First American Financial Acquires Tele-Track Inc.," PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Richardson et al., "Predicting Clicks: Estimating the Click-Through Rate for New Ads," (May 2007).
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Inforamtionweek, (Oct. 4, 1999) 2 pages.
Kirkpatrick, K., "Electronic Exchange 2000, The," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7p. 24; Proquest #11267840, 5 pages.
redhat .com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware—Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customers Choice", Cards International, No. 143, p. 9, (Nov. 1995) 2 pages.

(56) References Cited

OTHER PUBLICATIONS

Wells Fargo Launches First Real-Time, Online Home Equity Credit Decision-Making Service, Business Wire, (Jun. 3, 1998), Dialog_File 621:New Product Announcement, 3 pages.
Handley, John, "Credit Review Lets the Numbers Do the Talking in Home Mortgage Game", Chicaao Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialoa File 625:American Banker Publications, (Mar. 21, 1982) 2 pages.
"What the Credit Bureau is Saying About You: If a Mistake Sneaks Into Your Record, You May Not Know About it Until You Get Turned Down for Credit", Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
"What Do FICO Scores Mean to Me?", http://www.sancap.com. (1999) 3 pages.
"What is a FICO Score?", http://www.aspeenloan.com (2009) 1 page.
"Credit", The New Encyclopaedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, p58 (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards—and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.

Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., for "For This New Visa, Only Web Surfers Need Apply," American Banker, vol. 1163, No. 34 12 (Feb. 20 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet Visa," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-_inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action issued Oct. 8, 2008, 14 pages.
"Sample Experian Credit Report" by Consumer Information consumerinfo.com (Jul. 9, 1998) 4 pages.
Plaintiffs Original Complaint, *Nextcard, LLC* v. *Liveperson, Inc.*; Civil Action No. 2:08-cv- 00184-TJW, in the U.S. District Court for the Eastern District of Texas, Marshall Division, filed Apr. 30, 2008 (7 pages).
Amended Complaint and Jury Demand; *Liveperson, Inc.* v. *Nextcard, LLC, et al.*; Civil Action No. 08-062 (GMS), in the U.S. District Court for the District of Delaware, filed Mar. 18, 2008 (5 pages).
Plaintiffs Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Compalint; *Nextcard, LLC* v. *American Express Company, et al*; Civil Action No. 2:07-cv-354 (TJW); In the U.S. District Court for the Eastern District of Texas, Marshall Division filed (Apr. 28, 2008), 13 pages.
Answer and Counterclaims of Defendant *DFS Services LLC*; *Nextcard, LLC* v. *American Express Company, et al*; Civil Action No. 2:07-cv-354 (TJW); In the U.S. District Court for the Eastern District of Texas, Marshall Division, filed Apr. 28, 2008 (13 pages).

(56) References Cited

OTHER PUBLICATIONS

Defendant The PNC Financial Services Group, Inc.'s Answer and Affirmative Defenses to Second Amended Complaint; Nextcard, LLC v. American Express Company, et al; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants HSBC North America Holdings Inc. and HSBC USA Inc.; Nextcard, LLC v. American Express Company, et al; Civil Action No. 2:07-cv-354 (TJW); In the U.S. District Court for the Eastern District of Texas, Marshall Division, filed May 14, 2008 (5 pages).
Plaintiffs Second Amended Reply to Counterclaims of Defendant DFS Services LLC; Nextcard, LLC v. American Express Company, et al; Civil Action No. 2:07-cv-354 (TJW); In the U.S. District Court for the Eastern District of Texas, Marshall Division, filed May 14, 2008 (7 pages).
Plaintiffs Second Amended Reply to Counterclaims of Defendant American Express Company; Nextcard, LLC v. American Express Company, et al; Civil Action No. 2:07-cv-354 (TLW); In the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
"ESL Federal Credit Union Inaugurates Internet Target Marketing." PR Newswire p. 4210 (Oct. 6, 1998), 3 pages.
Kim S. Nash "Call all Customers." Computerworld, 32 (1), 25-28 (Dec. 1997), 2 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Welcome to Keen retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" SEARCHER, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (Mar. 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
International Search Report for PCT Application No. PCT/US2011/031239, mailed on Jul. 7, 2011, 3 pages.
International Search Report for PCT Application No. PCT/US2011/064946, mailed on Jun. 22, 2012, 3 pages.
International Search Report for PCT Application No. PCT/US03/41090, mailed on Sep. 1, 2004, 3 pages.
International Search Report for PCT Application No. PCT/US05/40012, mailed on Oct. 5, 2007, 2 pages.
International Preliminary Report on Patentability for PCT Application No. PCT/US2011/031239, dated Oct. 9, 2012, 8 pages.
International Preliminary Report on Patentability for PCT Application No. PCT/US2006/039630, dated Apr. 16, 2008, 4 pages.
International Search Report and Written Opinion for PCT Application No. PCT/US2013/037086, mailed Jul. 12, 2013, 9 pages.
International Search Report and Written Opinion for PCT Application No. PCT/US2013/29389, mailed Jul. 24, 2013, 8 pages.
International Search Report and Written Opinion for PCT Application No. PCT/US2013/038212, mailed Jul. 17, 2013, 11 pages.
International Search Report and Written Opinion for PCT Application No. PCT/US2013/041147, mailed Jul. 30, 2013, 9 pages.
Non-Final Office Action of Dec. 11, 2008 for U.S. Appl. No. 11/394,078, 15 pages.
Final Office Action of Jul. 9, 2009 for U.S. Appl. No. 11/394,078, 15 pages.
Non-Final Office Action of Jan. 28, 2010 for U.S. Appl. No. 11/394,078, 14 pages.
Final Office Action of Jul. 9, 2010 for U.S. Appl. No. 11/394,078, 16 pages.
Non-Final Office Action of Feb. 1, 2011 for U.S. Appl. No. 11/394,078, 20 pages.
Final Office Action of Aug. 2, 2011 for U.S. Appl. No. 11/394,078, 23 pages.
Non-Final Office Action of May 16, 2012 for U.S. Appl. No. 11/394,078, 23 pages.
Final Office Action of Jan. 5, 2013 for U.S. Appl. No. 11/394,078, 22 pages.
Non-Final Office Action of Jun. 22, 2012 for U.S. Appl. No. 13/080,324, 9 pages.
Non-Final Office Action of Jan. 16, 2012 for U.S. Appl. No. 12/725,999, 13 pages.
Final Office Action of Aug. 2, 2012 for U.S. Appl. No. 12/725,999, 15 pages.
Non-Final Office Action of Aug. 15, 2012 for U.S. Appl. No. 12/967,782, 31 pages.
Non-Final Office Action of Jul. 29, 2011 for U.S. Appl. No. 12/608,117, 20 pages.
Final Office Action of Apr. 4, 2012 for U.S. Appl. No. 12/608,117, 25 pages.
Non-Final Office Action of Apr. 24, 2004 for U.S. Appl. No. 09/922,753, 16 pages.
Final Office Action of Oct. 14, 2004 for U.S. Appl. No. 09/922,753, 13 pages.
Non-Final Office Action of May 17, 2005 for U.S. Appl. No. 09/922,753, 13 pages.
Non-Final Office Action of Mar. 14, 2006 for U.S. Appl. No. 09/922,753, 13 pages.
Final Office Action of Jul. 26, 2006 for U.S. Appl. No. 09/922,753, 13 pages.
Non-Final Office Action of Aug. 13, 2008 for U.S. Appl. No. 09/922,753, 10 pages.
Final Office Action of Apr. 23, 2009 for U.S. Appl. No. 09/922,753, 11 pages.
Non-Final Office Action of Jul. 21, 2009 for U.S. Appl. No. 09/922,753, 10 pages.
Final Office Action of Feb. 18, 2010 for U.S. Appl. No. 09/922,753, 9 pages.
Non-Final Office Action of Apr. 25, 2011 for U.S. Appl. No. 09/922,753, 9 pages.
Final Office Action of Nov. 25, 2011 for U.S. Appl. No. 09/922,753, 10 pages.
Non-Final Office Action of Aug. 7, 2007 for U.S. Appl. No. 10/980,613, 16 pages.
Non-Final Office Action of May 15, 2008 for U.S. Appl. No. 10/980,613, 23 pages.
Non-Final Office Action of Apr. 30, 2012 for U.S. Appl. No. 12/504,265, 16 pages.
Final Office Action of Aug. 28, 2012 for U.S. Appl. No. 12/504,265, 28 pages.
Final Office Action of Feb. 14, 2013 for U.S. Appl. No. 13/080,324, 11 pages.
Final Office Action of Apr. 11, 2013 for U.S. Appl. No. 12/967,782 18 pages.
Non-Final Office Action of Jun. 12, 2013 for U.S. Appl. No. 12/608,117, 56 pages.

(56) References Cited

OTHER PUBLICATIONS

Non-Final Office Action of Jul. 8, 2013 for U.S. Appl. No. 13/413,197, 10 pages.
Non-Final Office Action of Jun. 27, 2013 for U.S. Appl. No. 12/504,265, 11 pages.
Non-Final Office Action of Jun. 20, 2013 for U.S. Appl. No. 13/157,936, 19 pages.
Non-Final Office Action of May 10, 2013 for U.S. Appl. No. 13/563,708, 20 pages.
Non-Final Office Action of Mar. 30, 2013 for U.S. Appl. No. 11/360,530, 23 pages.
Non-Final Office Action of Oct. 30, 2013 for U.S. Appl. No. 13/961,072, 10 pages.
Non-Final Office Action of Dec. 5, 2013 for U.S. Appl. No. 12/967,782, 14 pages.
Final Office Action of Oct. 21, 2013 for U.S. Appl. No. 12/504,265 14 pages.
Notice of Allowance of Jan. 3, 2014 for U.S. Appl. No. 11/360,530, 29 pages.
Final Office Action of Jan. 22, 2014 for U.S. Appl. No. 12/608,117, 45 pages.
Final Office Action of Jan. 27, 2014 for U.S. Appl. No. 13/563,708, 35 pages.
Non-Final Office Action of Jan. 30, 2014 for U.S. Appl. No. 13/413,158, 19 pages.
Notice of Allowance of Feb. 12, 2014 for U.S. Appl. No. 13/157,936, 33 pages.
Final Office Action of Feb. 19, 2014 for U.S. Appl. No. 13/961,072, 35 pages.
Non-Final Office Action of Feb. 20, 2014 for U.S. Appl. No. 10/980,613, 43 pages.
Notice of Allowance of Feb. 28, 2014 for U.S. Appl. No. 09/922,753, 13 pages.
Notice of Allowance of Mar. 25, 2014 for U.S. Appl. No. 12/504,265, 31 pages.
Notice of Allowance of Mar. 31, 2014 for U.S. Appl. No. 12/725,999, 41 pages.
Notice of Allowance of Apr. 1, 2014 for U.S. Appl. No. 13/413,197, 32 pages.
Non-Final Office Action of Jul. 17, 2014 for U.S. Appl. No. 11/394,078, 41 pages.
Non-Final Office Action of Jul. 31, 2014 for U.S. Appl. No. 13/080,324, 38 pages.
Notice of Allowance of Aug. 18, 2014 for U.S. Appl. No. 12/967,782, 43 pages.
Non-Final Office Action of Aug. 21, 2014 for U.S. Appl. No. 10/980,613, 43 pages.
Extended European Search Report dated Jul. 7, 2015 for European Patent Application No. 15161694.3; 8 pages.
Non-Final Office Acton of Jun. 2, 2015 for U.S. Appl. No. 12/608,117, 26 pages.
First Action Interview Pilot Program Pre-Interview Communication of Jun. 19, 2015 for U.S. Appl. No. 14/244,830, 7 pages.
Non-Final Office Action of Jul. 20, 2015 for U.S. Patent Application No. 14/711,609; 12 pages.
Non-Final Office Action of Jul. 20, 2015 for U.S. Appl. No. 14/500,537; 12 pages.
Final Office Action of Jul. 31, 2015 for U.S. Appl. No. 14/317,346, 13 pages.
Final Office Action of Aug. 10, 2015 for U.S. Appl. No. 13/961,072, 12 pages.
Non-Final Office Action of Aug. 14, 2015 for U.S. Appl. No. 14/543,397, 12 pages.
Non-Final Office Action of Aug. 18, 2015 for U.S. Appl. No. 14/570,963, 23 pages.
Non-Final Office Action of Aug. 27, 2015 for U.S. Appl. No. 11/394,078, 21 pages.
International Preliminary Report on Patentability for PCT Application No. PCT/US2013/29389, mailed Sep. 18, 2014, 6 pages.
International Preliminary Report on Patentability for PCT Application No. PCT/US2013/038212, mailed Nov. 6, 2014, 8 pages.
International Preliminary Report on Patentability for PCT Application No. PCT/US2013/041147, mailed Jan. 22, 2015, 21 pages.
International Search Report for PCT Application No. PCT/US2013/025142, mailed Jun. 5, 2013, 4 pages.
International Preliminary Report on Patentability for PCT Application No. PCT/US2013/025142, mailed Aug. 21, 2014, 5 pages.
Notice of Allowance of Sep. 17, 2014 for U.S. Appl. No. 13/413,158, 14 pages.
Notice of Allowance of Sep. 26, 2014 for U.S. Appl. No. 13/563,708, 14 pages.
Non-Final Office Action of Dec. 4, 2014 for U.S. Appl. No. 14/275,698, 6 pages.
Non-Final Office Action of Dec. 23, 2014 for U.S. Appl. No. 13/961,072, 11 pages.
Non-Final Office Action of Jan. 21, 2015 for U.S. Appl. No. 14/500,502, 8 pages.
Final Office Action of Jan. 29, 2015 for U.S. Appl. No. 14/245,400, 28 pages.
International Search Report and Written Opinion for PCT Application No. PCT/US14/49822, mailed Feb. 27, 2015, 11 pages.
Final Office Action of Mar. 12, 2015 for U.S. Appl. No. 13/080,324, 13 pages.
Non-Final Office Action of Mar. 13, 2015 for U.S. Appl. No. 13/841,434, 26 pages.
Non-Final Office Action of Apr. 9, 2015 for U.S. Appl. No. 13/830,719, 24 pages.
Final Office Action of Apr. 7, 2015 for U.S. Appl. No. 11/394,078, 18 pages.
Notice of Allowance of Mar. 30, 2015 for U.S. Appl. No. 14/275,698, 11 pages.
Non-Final Office Action of Apr. 6, 2015 for U.S. Appl. No. 14/322,736, 13 pages.
Non-Final Office Action of May 7, 2015 for U.S. Appl. No. 13/829,708, 16 pages.
Final Office Action of May 8, 2015 for U.S. Appl. No. 10/980,613, 18 pages.
Non-Final Office Action of May 13, 2015 for U.S. Appl. No. 14/317,346, 21 pages.
Non-Final Office Action of Dec. 24, 2015 for U.S. Appl. No. 14/317,346, 15 pages.
Notice of Allowance of Dec. 30, 2015 for U.S. Appl. No. 14/322,736, 9 pages.
Non-Final Office Action of Jan. 5, 2016 for U.S. Appl. No. 14/245,400, 33 pages.
Notice of Allowance of Jan. 7, 2016 for U.S. Appl. No. 14/313,511, 5 pages.
First Action Interview Pilot Program Pre-Interview Communication of Jan. 12, 2016 for U.S. Appl. No. 14/753,496, 3 pages.
Notice of Allowance of Jan. 20, 2016 for U.S. Appl. No. 13/829,708, 11 pages.
Final Office Action of Jan. 29, 2016 for U.S. Appl. No. 14/711,609; 15 pages.
Final Office Action of Jan. 29, 2016 for U.S. Appl. No. 14/500,537; 15 pages.
Non-Final Office Action of Feb. 12, 2016 for U.S. Appl. No. 13/080,324, 15 pages.
Notice of Allowance of Mar. 16, 2016 for U.S. Appl. No. 14/582,550; 9 pages.
Notice of Allowance of Mar. 21, 2016 for U.S. Appl. No. 14/753,496; 5 pages.
Non-Final Office Action of Sep. 11, 2015 for U.S. Appl. No. 14/500,502; 12 pages.
Notice of Allowance of Sep. 18, 2015 for U.S. Appl. No. 14/244,830, 11 pages.
First Action Interview Pilot Program Pre-Interview Communication of Oct. 21, 2015 for U.S. Appl. No. 14/313,511, 3 pages.
Final Office Action of Oct. 22, 2015 for U.S. Appl. No. 13/830,719, 29 pages.
Final Office Action of Nov. 10, 2015 for U.S. Appl. No. 13/841,434; 30 pages.

(56) References Cited

OTHER PUBLICATIONS

Final Office Acton of Nov. 17, 2015 for U.S. Appl. No. 12/608,117, 32 pages.
Non-Final Office Action of Dec. 4, 2015 for U.S. Appl. No. 10/980,613 21 pages.

* cited by examiner

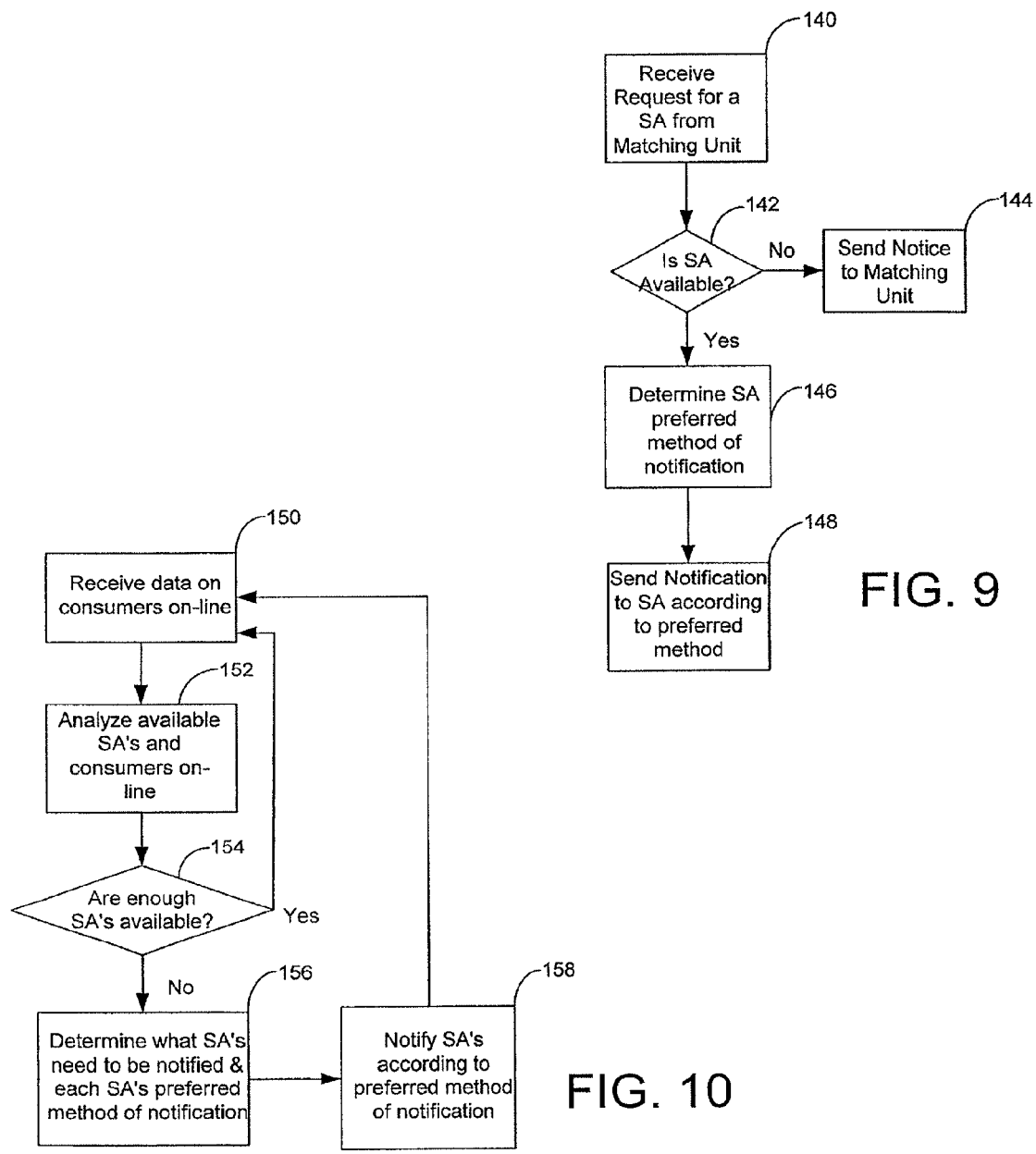

SYSTEMS AND METHODS TO FACILITATE SELLING OF PRODUCTS AND SERVICES

CROSS-REFERENCE TO RELATED APPLICATION

This application claims priority to U.S. application Ser. No. 09/922,753, filed Aug. 6, 2001, which claims priority to U.S. provisional application Ser. No. 60/244,039, filed Oct. 26, 2000, which documents are incorporated herein by this reference.

FIELD OF THE INVENTION

The present invention relates generally to electronic commerce, and more particularly to methods and systems to facilitate selling interactions that originate online.

BACKGROUND OF THE INVENTION

Electronic commerce, or "e-commerce," as it is commonly referred to, involves the sales of goods or services over, through or in conjunction with the Internet. Currently, e-commerce largely concerns the sale of goods or services that are relatively simple in terms of the product variability and complexity. Most e-commerce today derives from one of just a few categories of goods that meet this test of simplicity: books, compact discs, flowers and travel (mainly just airline seats). E-commerce is restricted to these categories of goods today largely because the goods themselves are simple enough that they can be presented in an catalog format. The customer does not need to consult with an expert in these goods or services before purchasing them. Thus, almost all Internet e-commerce sites today are sterile, pure self-service environments.

The complexity and variability of goods and services that sell online is increasing as greater numbers of enterprises of those goods seek to leverage the distributional efficiencies of the Internet. The increase in the complexity and variability of goods and services requires an increase in the consultative nature of the sales experience for the customer.

For example, in the travel category, most online purchasing activity currently relates to airline seats. When purchasing airline seats a customer has essentially two variables to deal with: (i) flight schedule and (ii) price. Otherwise, one airline seat is generally the same as any other. However, as the enterprises seek to sell exotic, luxury travel packages, such as safaris to Africa or boat trips through the Amazonian Rainforest over the Internet, the variables and the complexity of the sales process increases dramatically. For such a sale, a customer will want to know where to stay, what kinds of food to eat (and what kinds not to eat), whether the territory is considered dangerous or the trip is considered rigorous, whether special inoculations are required, and other complex questions. These questions demonstrate the added variety and complexity of the inputs necessary for the customer to make an informed purchase decision for this kind of service and they fundamentally require human interaction with a knowledgeable sales agent or product specialist to be answered in a meaningful way. The same type of complexity is inherent in the purchase of a variety of other goods and services including banking services (mortgages, retail banking, wealth planning), insurance services, electronics, luxury retail goods (fine watches, jewelry) and automobiles. Sale of these products requires a "trusted relationship" between a customer and a live sales expert who can use proven internal and external resources as collateral sales material to close the sale. Fundamentally, these products are sold, not just dropped in a shopping cart and purchased.

In the offline world today, purveyors of these complex goods and services strive to create comfortable retail environments in which knowledgeable personnel politely answer customers' questions about product and service features, capabilities and alternatives, facilitate sales, and upsell related products and services, such as service warranties. For example, when shopping for a camera in an offline store, sales associate will guide the customer toward the right camera, sell additional lenses, a case, batteries, a warranty, and perhaps some film before physically walking the customer to the cash register and closing the sale. E-commerce environments, by contrast, are almost completely self-service environments, notwithstanding the existence of chat platforms and other technologies that facilitate online interaction.

It is clear that there is a much higher level of interaction in the physical world. Customers have come to expect that there will be someone available in a physical location that can answer questions about products and direct them through the process. It is also frequently the case that a high-end shopper from a wealthy demographic is matched with a sales associate who, though otherwise skilled in the product to be sold, is mismatched with the demographic and psychographic characteristics of the buyer.

As enterprises attempt to increase the type and volume of goods and services bought through an online origination, the availability of knowledgeable expertise and assistance and relevant sales collateral materials must be addressed in order to persuade customers that they can obtain enough product-centric information to make buying over, through or in conjunction with the online channel an easy, pleasant experience that is equal or superior to shopping through other channels. Moreover, the Internet fundamentally changes the way goods and services are bought by customers. In the offline world, customers go to a store to buy a product; online, customers seek a product first, and then identify a store from which it can be purchased.

While a number of companies have extended existing call center technology into Internet sales environments in order to enable live voice or chat sessions with browsing customers, the Internet retail experience is still largely sterile and unsatisfying. Rather, the current online interaction focuses on customer service rather than sales—a significant distinction as customer services personnel are not well-suited to closing sales.

"Customer relationship management" ("CRM" or, as adopted for the online world, "eCRM") solutions providers have existed for several years now. However, few if any of these solutions facilitate meaningful, direct human interaction through the online channel. In fact, many CRM solutions that have offered call center support for catalogs and have simply extended their product offering to include Frequently Asked Questions ("FAQ"), e-mail and chat—features that most of the eCRM companies have in common. Many eCRM enterprises have thus chosen to focus on facilitating "touchless" e-commerce transactions, i.e., transactions that do NOT require human intervention.

Online chat or instant messaging is the most personalized and sophisticated mode of customer/sales associate interaction. Using platforms developed by companies like AOL, these programs facilitate real-time online chat between the two parties, occasionally allowing the sales representative to "push" web pages or content to the customer in order to guide the customer to products or information. Some eCRM companies take this one step further by offering voice over IP. With voice over IP, if the customer has the right equipment on her computer she can talk to a customer service representative via the Internet. Most of the programs require the customer to log in to the chat session, allowing the customer service representative to maintain a history of customer contact. Some of the programs also allow the sales associate to view the complete customer purchase and communication history. Again, however, these platforms are typically staffed by customer service representatives and not sales associates and do not involve any "matching" of the right agent with the customer based on the agent's profile and skills, the customer's demographic and psychographic characteristics and the nature of the browsing opportunity.

FAQ services use historical "common" inquiries to generate template responses to customer questions. Some products go a step further and use artificial intelligence to analyze customer inquiries and generate "smart" answers. E-mail products also use gateway screening or artificial intelligence to answer customer questions in a more efficient manner than having a customer service representative personally respond to each question. Some e-mail programs also add direct e-mailing capabilities that can target and customize e-mail campaigns according to historical customer data. Some eCRM providers have product configurator applications. With these applications a customer is provided with a variety of questions regarding the features of the product they are interested in. Based on the answers to the questions the application will provide a suggestion as to the best configuration of the product for the customer. This solution is still a "touchless" experience from the standpoint of human interaction.

In general, CRM is reactionary—generally focused on post sale activity, such as, keeping existing customers, resolving problems, and managing customer relationships. CRM representatives are generalists, with no specific product or sales knowledge. By comparison, sales is proactive—focused on pre-sale activity, such as, obtaining customers, avoiding problems, creating customer relationships, and assisting customers in the purchase of goods or services. Sales associates are trained in the art of selling and posses specific and in-depth knowledge about goods and services.

A system does not exist that (i) matches browsing customers with experienced, knowledgeable sales personnel, (ii) provides relevant, opportunity-centric sales collateral information to the sales personnel and then (iii) facilitates the type of interaction between the customer and the sales person that is familiar in the offline world.

SUMMARY OF THE INVENTION

The present invention addresses the current lack of online sales assistance by creating the infrastructure to establish a system that allows accredited, experienced and product-knowledgeable sales personnel to sell goods and services (collectively, "products"), particularly complex, highly-consultative products, more effectively over, through, or in conjunction with online channels. The terms "over, through or in conjunction with the Internet," used singly or in combination, contemplate sales that occur through the present invention that (i) are effected solely through online interaction, as well as sales that occur through the present invention that merely originate online or (ii) are captured online, such as through the present invention, but are consummated either through a telephone connection (as contemplated herein) or in an offline (face-to-face) setting. With regard to the scenarios contemplated in item (ii) above, the present invention represents a bridge that connects online and offline selling.

The present invention fundamentally changes the Internet purchasing experience from one akin to browsing in a catalog to one similar to purchasing goods or services in the offline world with real time access to people who are knowledgeable in the goods or services being purchased and skilled in the art of closing a sale. Moreover, the present invention provides the sales personnel with product information from the enterprise and third parties. The present invention further monitors each sale and accumulates a record of effective sales techniques and information. The present invention further provides real-time communication functionality, via Internet chat, voice over IP, Internet streaming and the public switched telephone network ("PSTN"), that facilitates live and effective communication between the sales associate ("SA") and the customer. The present invention may be implemented by an enterprise either on a standalone basis or on a basis that is integrated (heavily or lightly) with other applications that operate in reference to an enterprise's Internet site (such as a one-to-one marketing application), or an enterprise's existing CRM, inventory, accounting or enterprise resource planning ("ERP") systems.

The present invention allows enterprises (whether principally online or offline in nature and heritage) to bring their existing sales force into contact with online browsers to further the enterprise's ultimate objective—generating more revenue, irrespective of where a given 'lead' originates. The present invention further allows a new paradigm to emerge by permitting sales associates to leverage their expertise in selling certain specific products for multiple providers of those products (e.g., for the sales associate to offer his expertise on a product-centric, rather than an enterprise-centric basis). A veritable army of available, highly qualified, independent sales associates (functioning as independent contractors with regard to the enterprise that sells the relevant product) may be unleashed by the present invention on an infinite number of live sales opportunities. Alternatively, the instant invention could be deployed within the paradigm commonly existing today—within a 'captive' sales force of existing employees of the enterprise, again allowing those employees to leverage their sales expertise on a product-centric basis.

The present invention is for use in connection with the Internet environment, whether wired or wireless, or can be used with other environments now and in the future. The present invention has application in offline environments as well. For example, the database of experienced mortgage agents created by the invention could be accessed by other mortgage agents within the enterprise (or by the enterprise's management or Human Relations department) to gather information as to who would be the best agent for the first agent to collaborate with on a given offline opportunity. Similarly, agents could use the database of sales collateral materials and their proven effectiveness in given situations to address a customer's objection expressed in an offline, face to face meeting. Thus, there are both offline and online applications and utilities of the present invention. Within this application, the word website shall generically mean any electronic interface to the enterprise and includes, but is not limited to, a website on the World Wide Web accessed via a computer or wireless device with a browser functionality and also includes any other electronic interface where a enterprise's goods or services can be purchased, including an Internet-enabled telephone or voice response system.

The system of the present invention provides SAs with interactive tools that allow them to emulate, as closely as possible, the interaction between customers and sales personnel that are commonly accepted in the offline world. The closer the online experience reflects its offline counterpart, the quicker consumers will adopt the online channel as an adjunct to existing channels. The system of the present invention performs several major tasks. First, the system provides a registration system for all SAs that enables the system to keep track of all SAs and allows for a credit and background check on the SA, if desired. The system also provides online training, education, and accreditation procedures that enable SAs to establish their competency to sell specific types and categories of products or services and to sell online in general (e.g., it measures the SAs online proficiencies, ability to type, ability to navigate the Web, etc.). The system determines whether a customer browsing on a website needs sales assistance based upon available clickstream and/or login data (the login data, for example, might identify the customer as a high-net worth individual who either already is or is eligible to become a 'private banking' client). The system also allows the customer either to ask for sales assistance or to be proactively approached with sales assistance by an SA who is accredited by the system to sell that product and who has been made aware of the opportunity by the opportunity-matching parameters of the system.

As noted above, the system includes a matching engine. The matching engine dynamically matches SAs with online customers based on a variety of enterprise and/or system-driven criteria in order to ensure that the most qualified SA is matched with each customer (based on known data about the browsing session (the nature of the opportunity), the customer and the agent and his or her rankings, permissions and ratings as defined by the registration module). The relevant matching criteria are varied and include clickstream data, demographic characteristics of the browser passed through login information or cookies, etc. The system permits the enterprise that is operating it to establish and weight these opportunity-matching parameters to achieve the best matches possible based on past experience with the system's or the enterprise's sales and marketing objectives. The matching engine additionally dynamically changes the matching criteria based on various factors, such as sales successes or changing market conditions. The matching engine ranks the SAs based on the matching criteria used and generates a list of SAs in rank order. The rules underlying the matching engine can be flexibly changed by the enterprise's staff to set different 'triggers' for SA/customer interaction in accordance with changes in the enterprise's sales and marketing strategy. In the offline world, a customer's encounter in a given shopping environment with the sales personnel available at that location is random, at best. For example, if an affluent consumer from the 30328 area code in Atlanta, Ga. enters a local bank branch seeking a complicated mortgage re-finance product, he may or may not encounter an appropriate expert available in the store at that time. In addition, he may or may not encounter an SA who knows how to address the needs and buying habits of affluent consumers. By comparison, in the financial institution's virtual storefront, the bank can effectively make its entire sales force available to handle all of the traffic encountered at the e-commerce site, but parse that traffic out to the most suitable SAs depending upon an array of variables: the type of product, the psychographic and demographic characteristics of both the customer and the SA, the sales skills of the SA in that product category and the SA's demonstrated ability to close a sale online. As a result, the enterprise is empowered to create far better "matches" between customers and its sales personnel in the online environment than is possible in the real world.

The mismatches of SA to opportunity, either in terms of the product expertise of the sales associate, or of the demographic and/or psychographic characteristics of the consumer and the sales associate, are addressed by the present invention. The present invention addresses this by matching product-specific SAs with browsing consumers based on (i) available clickstream data that passes information to the system about the nature of the sales opportunity itself, (ii) demographic information about the customer, (iii) information about the proficiencies of the SAs in the enterprise's sales force (e.g., which ones sell well into these types of product opportunities to these types of customers) and (iv) the nature of the 'triggers,' or matching rules established by the enterprise.

After the matching engine performs the matching function, the SA can be linked to the customer in a variety of ways. First, the system can seek out the best qualified SA for a given opportunity; if that SA is not available, the matching engine will go to the next best qualified SA and so on until the customer is being helped. The matching engine can notify the SA of the opportunity even when he or she is not logged on, such as through a page or a call to the associate's telephone. Second, the matching engine can notify the top several SAs and let the SAs "race" to the customer.

Alternatively, the matching engine can simply provide the SAs with their matching score (or simply notify them, without necessarily providing their score, that they are eligible for a given engagement), and let the SAs decide whether to contact the customer (or let the SAs 'race' to the customer). This information is provided to the SA on a series of SA-facing pages (effectively, an SA desktop) that the SA can view to see, on a dynamic, real-time basis, the number and kind of browsing consumers that the SA is qualified under the system to approach. So, the SA can identify opportunities simply by being logged on to the system or the SA, with the enterprise's permission, can be contacted by the system when an appropriate opportunity for that agent is identified by the system.

In essence, the matching engine allows for "can" and "must" approaches, as established through the system by the enterprise (e.g., the vendor of a given product) that controls its operation. A "can" situation is defined by the system as one in which an agent may (permissively) approach a browsing consumer based on elements of the matching engine. A "must" situation is defined as one that the enterprise has defined as requiring an SA to approach (mandatory). The system allows both "can" and "must" scenarios to be executed, and for the parameters that define these scenarios to be established, weighted, ranked and then re-ranked based on actual performance.

The system can operate independently to the enterprise's online channel or be connected to the enterprise's CRM, eCRM or other marketing systems to obtain information about known customers (the system of course allows SAs to approach both customers who are known to the enterprise (such as through login information or a cookie) and customers who are, as far as the enterprise knows at the time of engagement, simply anonymous browsers). The system can also be connected to the enterprise's ERP system to obtain product and catalog data, such as alternative product or service choices, and any related products or services, as well as excess inventory, reduced prices, and any other packages controlled by the enterprise. This information is provided to the SA on the SA facing web pages.

An external data gathering engine allows the SAs to collect and repurpose, at the point of opportunity, collateral sales material (either from the enterprise or from third-party sources available on the Internet or from other sources) that may be helpful in the sales process. For example, an SA could perhaps locate an article on the Web from The Wall Street Journal that explains why now is the time to refinance; the SA might share that article with a browsing customer to convince the customer not to postpone the decision. A wide variety of data, both internal and external to the client enterprise, could be gathered that might prove helpful to closing the sale, including existing enterprise-provided sales and marketing materials, magazine articles, financial calculators, other competitors' web sites or competitive comparisons. The data gathering engine collects this information (as established in a baseline (i.e., initial) configuration), and as it has subsequently been used collectively throughout the enterprise's sales force), and then can recommend specific pieces of collateral information for use in conjunction with any particular opportunity to the SA via the SA facing web pages.

Additionally, the system includes a best practices engine that monitors the entire sales engagement in order to develop a database of what techniques and collateral sales material were successful and what were not successful in particular sales transactions. The best practices engine continually rates and re-ranks both SAs (in terms of the opportunities available to them) and collateral sales materials (again, on an opportunity-centric basis) on the basis of all activity captured by the system up to that moment. Accordingly, the system dynamically provides "up-to-the-minute" rankings and the most effective matches of both SAs and collateral sales material to any given opportunity. During a sales transaction, the SA is provided with these proven "best practices" via the SA facing web pages to assist the SA in closing the sale.

The system does not have to result in the "closing" of transactions purely through online interaction in order to be effective. For example, in a situation as complex as a mortgage transaction, it may be sufficient for the engagement to originate online at a browsing session, for the SA to achieve an introduction through a proactive chat session, for the session to bridge from chat to a PSTN conference call, for the agent to make an appointment with the consumer at a retail location and for the sale ultimately to be consummated face-to-face in a bank branch. Accordingly, the utility of the application is not limited to the online channel. Hence, the present invention also contemplates functionality that will allow a sales associate to first communicate with a consumer in chat, but also to bridge from the chat session to a telephonic conference call through the PSTN or via VOIP technology.

The system also continually monitors the sales process and provides this information as well as reports on consumers, SAs, and sales to the enterprise through enterprise facing web pages. This information can also be sent to offline databases maintained by the enterprise for corporate management purposes (for example, to an ERP or human resources system). The system can provide integrated SA compensation accounting, if necessary. Further, the system collects a robust database of customer purchasing patterns that provides valuable customer behavior data to the SAs and enterprises. This data drives future matchmaking (both in terms of agents and collateral sales data that are brought to bear on any given opportunity scenario), and also facilitates and informs future direct marketing and e-commerce initiatives. Therefore, the present invention will substantially enhance customers' online e-commerce experiences and materially increase the volume of sales made in, over, through, or in conjunction with online environments.

Virtually any enterprise that sells complex or consultative products or services and that has a website can benefit from the present invention. Many websites, such as auction sites and business to business exchange platforms, financial sites, travel sites, catering service sites, wholesale and retail sites, can benefit greatly from the present invention. Also, as noted above, there are benefits to the enterprise, in the form of additional data for managing the enterprise, that are effectively independent of the existence of the web site.

The online channel today is limited to merchandise that has certain commodity characteristics that are not so complex as to require sales people to close the sale. The present invention, by contrast, enhances the effectiveness of the online sales process particularly with respect to more complex, less commoditized offerings such as electronic equipment, automobiles, financial products (mortgages, car leases and other loans, insurance, wealth planning, mutual funds and securities), luxury products (such as fine food and wine, jewelry, cosmetics) and other merchandise and services that typically require a high-level of sales assistance. Thus, the present invention allows enterprises to substantially expand the categories of merchandise that can be effectively sold through or in conjunction with an online channel. Moreover, by allowing SAs to proactively approach browsers online, the present invention effectively allows enterprises to man their online presence with real people, who can then use the communication functionality offered through the present invention to address consumers' needs in real time, either for the purpose of closing the deal online or generating a 'hot lead' that can then be passed into the existing offline channel. Thus, the present invention effectively marries or bridges the online and offline selling processes, and allows the enterprise's existing "offline" human selling resources to be leveraged against online opportunities.

Online customer service solutions are expected to grow from a $162 million market in 1999 to $1.95 billion in 2004. Most such solutions are focused on the post-sale, eCRM space. The present invention, by contrast, focuses on sales as a discipline that is distinct from customer service. Moreover, the present invention addresses the online sales problem by matching real-time sales opportunities with experienced, accredited, knowledgeable sales personnel—in effect placing a human face into the online channel—and arming those personnel with opportunity-centric collateral sales material.

A major difference between current eCRM solutions and the present invention is that the present invention goes beyond existing CRM tactics by matching the customer with the best SAs for the customer's needs on an opportunity-centric and customer-centric basis, bringing the most appropriate SA to the opportunity, and then providing that SA with the necessary tools to complete the sale (both data assets and communication functionalities). This should be compared to current eCRM solutions that merely provide access to a call center representative who is inadequately trained to answer questions about products or suggest reasonable alternatives to the customer. By establishing personalized, human interaction as part of the sales process rather than waiting for a customer to ask for assistance, the present invention dramatically improves the e-commerce experience. Additionally, the present invention allows for an SA to have a relationship with the customer (rather than the "database" building a relationship with the customer), helping to facilitate a smoother transition (from a customer experience perspective) from a bricks and mortar purchasing experience. Further, the present invention provides an intelligent, personalized solution—not an artificially intelligent, mechanized solution. Finally, the present invention contemplates a series of real-time communication functionalities—chat, VOIP, streaming media and, importantly, the PSTN—that bridge the online and offline channels and make the online experience far more robust from a selling perspective.

Perhaps the most compelling reason for increasing customer satisfaction by using SAs is to increase customer loyalty. Repeat customers visit a site twice as often and spend one-third more than the casual visitor. SAs can be expected to establish ongoing relationships with customers, increase spending per customer (the average sale amount today is $112 per transaction), as well as growing the number of repeat customers.

BRIEF DESCRIPTION OF THE DRAWINGS

FIG. 9 is a screen shot of a Certification function of the SA user interface.

FIG. 10 is a flow diagram of the sales process according to an embodiment of the present invention.

DETAILED DESCRIPTION

Figure 1:
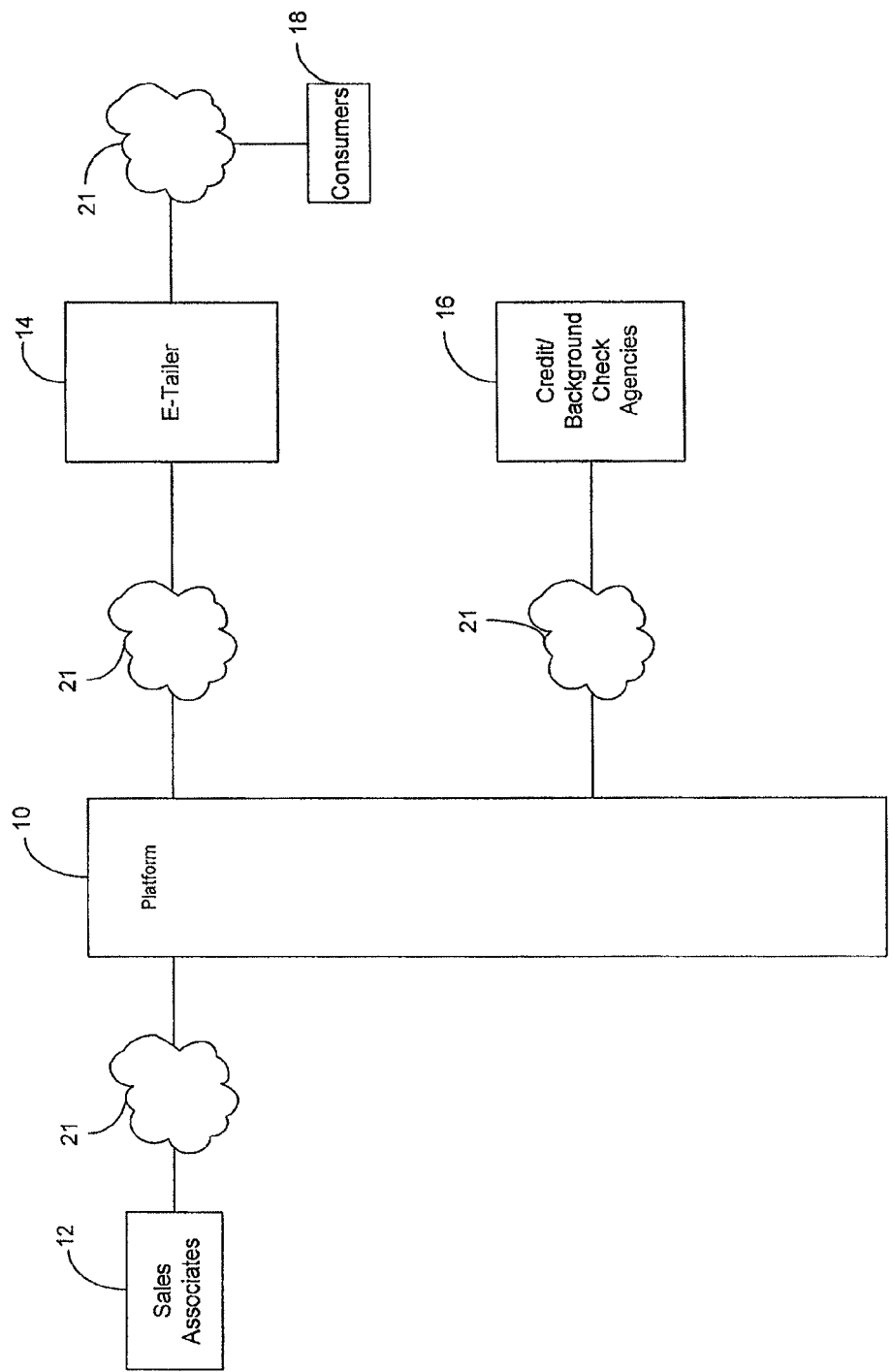
FIG. 1 is a functional diagram illustrating the external connectivity of a preferred embodiment of a system for linking sales associates with customers according to the present invention.

FIG. 1 shows the connectivity of an embodiment of the system 10 of the present invention to other entities. System 10 can interface with other external entities, sales associates ("SAs") 214, enterprises 14, credit/background check agencies 16, enterprise related third parties 17, and unrelated third parties 18. System 10 is indirectly connected to customers 200 through the enterprise 14. System 10 matches a customer with the best qualified SA or SAs based on predetermined criteria and provides the SAs with sales tools and information to enable SAs via SA-facing web pages to ably assist customers to make purchases at the enterprise's website. Further communication between the SAs and customers is facilitated by the communication bridge 234. System 10 further provides enterprise-facing web pages to enable the enterprise to monitor the sales process.

An enterprise, as previously described, can be any organization or institution that engages in the selling of products, goods, or services of a complex nature. Retailers, insurance companies, real estate companies, auctions, professional services firms, travel agencies, financial institutions, stock brokers, and others similarly situated fit within the broad and limitless profile of organizations who utilize the systems and processes according to the present invention.

SAs can work for the enterprise, Captive SAs (CSA), or can be Independent SAs (ISA), who represent the same product or set of products as independent contractors for a number of different enterprises.

Examples of some enterprise related third parties 17 are the enterprise's CRM or eCRM system, the enterprise's ERP system, the enterprise's data mining/analytics/marketing platforms, the enterprise's human resources system, and the enterprise's inventory, accounting and other back office systems. Unrelated third parties 18 are parties that have relevant information to assist in the selling process, such as Consumer Reports, the Wall Street Journal and even conceivably a competitor's website (assuming a comparison of the primary vendor's offering with the competitor's offering will reflect favorably on the primary vendor's offering). Credit/background reporting services 16 are any service that provides information on a person's credit history, criminal record, and other personal background information. These services can be accessed to verify the identity of an SA or assist an enterprise in accrediting an SA (the latter function is particularly important insofar as the enterprise is engaging ISAs, who are unlikely to be known to the enterprise, as independent contractors). In CSA scenarios, this information will most likely be passed from the enterprise's ERP and/or HR system directly to the system.

System 10 may take the form of a network of desired systems, computers, or other functionality, located in one or more geographical locations, miming any desired operating systems and applications. In one embodiment, system 10 is J2EE compliant and is implemented on a Sun Microsystems, JAVA-based architecture and in another embodiment system 10 is implemented in a Linux-based system. System 10 may be connected to the sales associates 12, enterprises 14, credit/background check services 16, and enterprise related third parties 17 and any other desired entity via public or private packet switched or other data networks including the Internet, circuit switched networks, such as the PSTN, wireless network, or any other desired communications infrastructure 21. Server is used herein to refer to an application on an individual server or a portion of a server shared with other applications.

Figure 2:
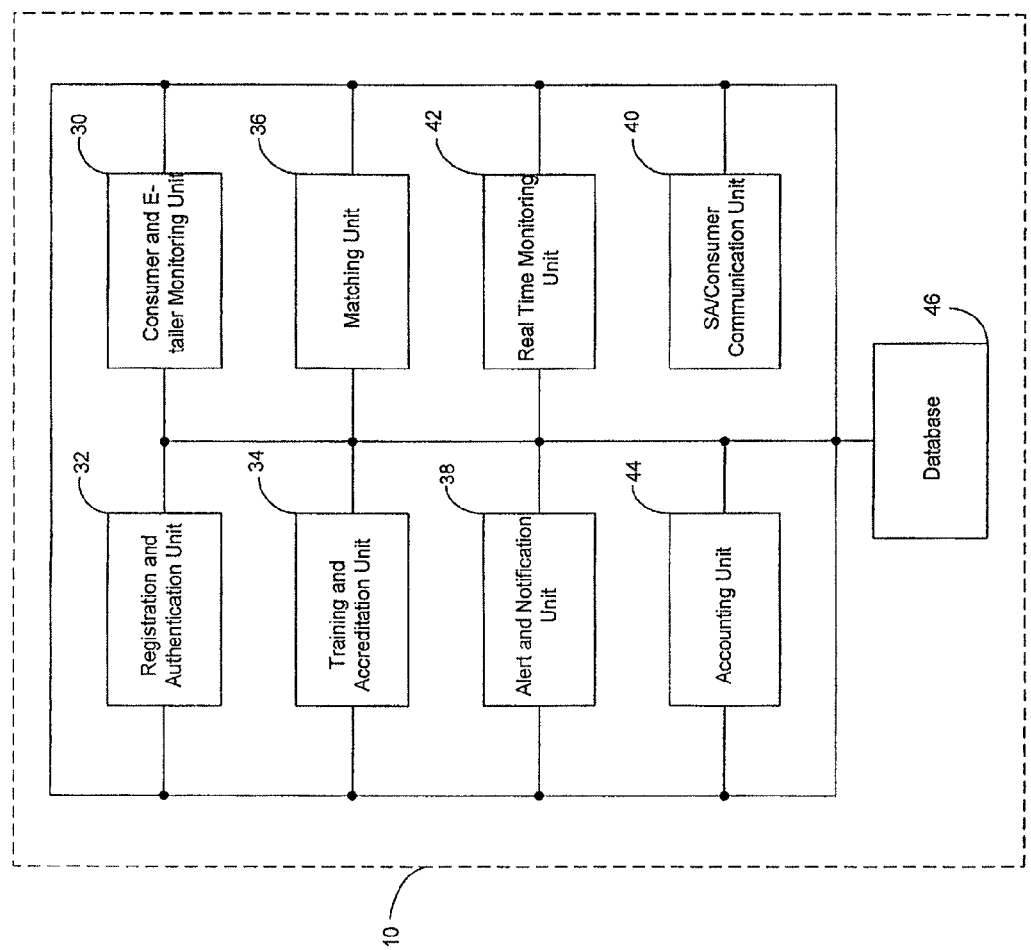
FIG. 2 is a functional diagram schematically illustrating the architecture of the system and the external connectivity of the system with an enterprise.

FIG. 2 illustrates schematically, in more detail, the connectivity and architecture of the system 10 when connected to a particular enterprise server 14. A customer 200 accesses a website at the enterprise server 14 via a web browser 202, such as Internet Explorer from Microsoft Corporation. As the customer is browsing the enterprise's website, the enterprise monitors the activities or session information of the customer 200. A session information message or messages, typically, but not necessarily, passed in XML format, are sent from the enterprise server 14 to an opportunity qualifier 204 in an engagement engine 205. Session information includes a variety of clickstream-derived data, such as, for example, whether the customer has requested assistance from an SA, whether the customer has indicated that it does not want assistance from an SA, the page on a website that the customer is viewing, and/or the goods or services the customer is examining on that page, demographic or other information about the customer extracted from the web page the customer is examining (such as the value of a mortgage that the customer is seeking, extracted from a mortgage calculator the customer is filling out), the contents of the customer's shopping cart, the time that the customer has looked at a given product on a given Web page, the customer's surfing pattern, the identity of the customer, and the customer's past purchasing history with this enterprise. The opportunity qualifier 204 may also receive customer information about the customer 200 from a enterprise's customer database 206 via a content engine 208. The content engine 208 accesses the customer database through, for example, the enterprise's eCRM system. The customer information may include some or all of the following information: the customer's name, address, past purchase information, past SAs used, items of interest, past site activity, and recommended purchases based on past purchasing history, if such information is available about the customer. Based on the session information and/or the customer information received, the opportunity qualifier 204 determines whether the customer is required to receive assistance from an SA (a "must" scenario) or is a potential target for permissive assistance from an SA (a "can" scenario).

If the opportunity qualifier 204 determines that the customer wants or could use help from an SA, the opportunity qualifier 204 sends an XML opportunity message to an Expert Sales Availability Choice Technology ("ExSACT") matching engine 212. The opportunity information sent to the ExSACT matching engine 212 from the opportunity qualifier 204 includes session information and customer information.

An SA connects to the system 10 either through the enterprise's internal network ("intranet") and/or through a web browser 216, such as Internet Explorer from Microsoft Corp. Before beginning to assist customers with specific goods or services, an SA must register with the system and must be accredited to sell the specific goods or services. An SA registers, trains and obtains certification via a skills engine 218. The Skills engine 218 may also receive performance data regarding SAs from the enterprise's existing ERP/HR systems 217. Performance data includes such things as the SA's performance ratings within the enterprise (based on an unlimited variety of performance criteria, including revenues, the SA's return or rescission rates, etc.), and any accreditations or licenses to sell certain products. This information on individual SAs is stored in the SA data base 219. The skills engine 218 also continually gathers information concerning sales transactions and the performance of the SAs within specific transactional contexts, and generates reports on the transactions as well as performance reports on the SAs. Such sales transaction information includes, for example, whether the sales transaction resulted in a sale, the amount of the sale, and the products sold or attempted to be sold. The skills engine 218 can include accounting applications to monitor the sales made over the system and manage the payment of SAs and invoicing of the enterprises. The system also includes applications that monitor and generate reports on the enterprises and customers and can be provided to the enterprise offline or online via enterprise facing web pages. If the system is used with independent SAs, the system connects with credit/background reporting services so that background and credit reports of the SA can be obtained. This information is likely not necessary with a captive SA.

Once an SA is online, registered, and certified, the SA can access the desktop 220. When an SA is logged into the desktop 220, the SA's profile information is sent to the ExSACT matching engine 212. An SA's profile information includes, for example, the SA's name, products or services accredited to sell by the system, and performance data with respect to the SA's performance using the system. The SA's profile information is continually updated by the system. Based on the profile information of the currently available SAs, customer information (if available), and session information, the matching engine creates an ordered list of available SAs best suited to assist the customer. The matching is done in a variety of enterprise- and system-specified ways, as explained in more detail below. The list of SAs is sent from the matching engine to the queue control 210 and the queue control ensures that an SA is paired up with the customer and that the SA responds to the opportunity.

The desktop 220 presents the SA with a communication user interface in the form of web pages through which the SA can monitor customers on the enterprise's website, interact with and assist the customers, interact with other SAs, and access various goods, services, best practices, and external information. The SA can take over the customer's navigation through the enterprise's website or can take the customer to a third party website. The collaboration feature can be provided by collaborative browsing tools from companies such as TogetherWeb, HipBone, and Cisco.

The desktop 220 receives product and catalog information from a product data base 224 via the content engine 208. The content engine 208 accesses the product data base 224 via, for example, the enterprise's ERP system. The types of product information include, for example, product specifications, collateral products (e.g., like products or product substitutes at varying price points), warranty information, product competitive data, comparative product information from other competitive enterprises and upsell and cross-sell information. The types of catalog information include, for example, inventory information (availability or backlog), pricing information, promotional or sale information, terms of sale, and commission information.

The desktop 220 receives external information from a caching database 225 via the content engine 208 and from a best practices database via a practices engine 230. The practices engine 230 collects and organizes in the caching database 225 and the best practices database 232 external materials such as product slicks, magazine articles, competitor comparisons, third-party financial calculators and comparison engines—essentially, any kind of information whether provided from the enterprise, from third parties and made available digitally (including information available on the Web) or from SAs in past selling situations (such as a good 'pitch' to use in a given sales scenario).

Product, catalog, and external information is gathered electronically, either passed from the product database 224 in the case of internal information, or, in the case of external information, generated from a baseline of external sources approved and established by the enterprise and captured through usage of the system over time. This information is then presented to the SA by the desktop 220. Product, catalog, and external information can be collectively referred to as sales information.

The desktop 220 receives best practices information from the best practices data base 232 via the practices engine 230. The practices engine 230 monitors all communication, data, external information, and resources (collectively "assets") used by an SA during a sales encounter and for a particular product or service. All of this information is then cataloged by enterprise, vertical and/or product as well as scored based upon the outcome of each related sales interaction to formulate a set of best practices. The best practices information is then stored in the best practices data base 232. The practices engine 230 indexes all aspects of the sales transaction (e.g., text transcripts of online chat sessions, audio transcripts of voice over IP sessions and/or telephone sessions, browser driving, etc.) in a manner that allows the practices engine to point-deploy dynamic best practice detail against the specific parameters of each sales engagement. During a sale, an SA has access to these stored best practices and external information through the desktop 220 to assist closing the sale, as discussed below with reference to FIGS. 7 and 8. The practices engine builds a correlation between the assets used, the use of an asset in a given opportunity, and how many times the asset was used successfully. This information can also be provided to enterprises offline or via enterprise facing web pages on the desktop 220, as it provides them with valuable customer behavior data.

Further communication between SAs and customers is facilitated by communication bridge 234. Communication bridge 234 facilitates methods of communication such as by telephone, instant messaging, web collaboration, web conferencing, e-mail, and voice over IP. The telephony side of the communication bridge 234 is known in the art and made by such companies as J2 Global Communications and Z-Tel Communications and the instant messaging and web collaboration side of the communications bridge is known in the art and made by such companies as Cisco, TogetherWeb, and HipBone. The communication bridge 234 can be internal or external to the system 10. Through this communication bridge, a customer/SA sales engagement commenced in chat online can be bridged through such a third-party to a PSTN-based conference call. This bridge is established either by the SA providing the customer with a toll free number to call or by the customer providing the SA with the customer's telephone number so that the SA call establish a telephone call with the customer via the communications bridge 234. In that conference call, if the SA has access to both a phone line and the Internet, the SA and customer can communicate via voice, while still maintaining a co-browsing session on the Internet, i.e., the SA can talk to the customer while navigating the customer through the Internet.

Figure 3:
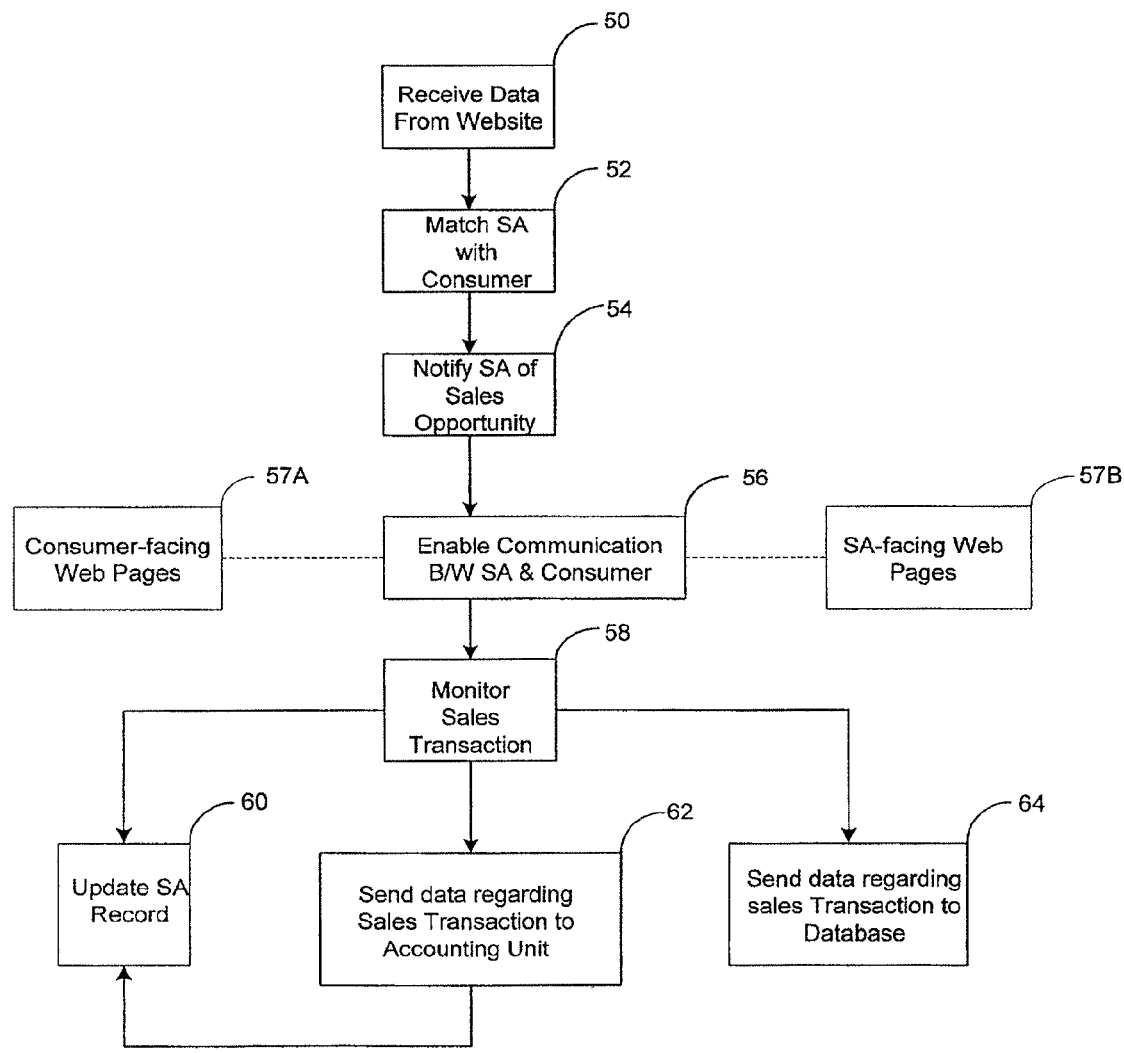
FIG. 3 is a flow diagram illustrating the registration and authentication process according to one embodiment of the present invention.

FIG. 3 provides a flow diagram of the registration and authentication process according to one embodiment of the present invention. At 70, the Skills engine 218 receives a registration request. At 72, the Skills engine 218 unit determines if the requester is a registered SA by the SA entering a preselected username and password or other identification verification mechanism. If the SA is registered with the system, the Skills engine 218 logs the SA in and updates its records of online sales agents, as shown at 74. If the SA is not registered, the Skills engine 218 requests sales associate information from the SA, as shown at 76. The requested sales associate information may include personal (including a picture), historical, and other core data, such as, the name, address, and phone number of the sales associate, the job title and status of the sales associate, how many years the sales associate has been in this job or related jobs, the products the sales associate is interested in selling or is accredited to sell (this could be in ranked order), and the sales associate's preferred schedule. The skills engine may also request and receive some enterprise sales associate information on the sales associate. This enterprise sales associate information includes, for example, the SA's employment history, performance data on the SA (revenues, rescission rates, etc.), and the products the SA is accredited or licensed to sell. Sales associate information and enterprise sales associate information is collectively combined with any other SA performance data to create an SA profile on each sales associate. If this is a captive sales agent (CSA), the CSA may be required to include security information to establish that she can sell for the particular enterprise. Alternatively, a CSA for a particular enterprise can register via a enterprise-specific URL to determine the CSA relationship.

At 78, the sales associate information is received from the SA. For fraud protection, the Skills engine 218 may cause a request to be sent to a credit/background check agency as shown at 80. This request may be sent directly from the system to the agency online or may be done offline. As a result, the system will be able to authoritatively identify SAs and prevent expelled SAs from gaining re-admittance under an assumed name. At 82, the Skills engine 218 receives the credit and background check data from the agencies. Again this can be done online or can be done offline. The Skills engine can also receive enterprise SA information, such as, for example, product accreditation information, schedule information, and other relevant information and performance data on the sales associate from the enterprise. The Skills engine 218 analyses any credit and background check data, any enterprise sales associate information, and sales associate information at 84 to determine if the SA is an acceptable candidate. If not, at 86, the SA is sent a rejection. If the SA is acceptable, the SA is sent a notification of her acceptance, given further instructions about registering and about the system. The notices can be sent either online or can be sent offline. The SA then may provide the system with her schedule and contact preferences, for example, (i) only when online and "available," (ii) off-line notification preferences, and (iii) off-line notification preferences based on SA-established schedule. At 89, the SA may be required to proceed to the training and accreditation process prior to completing the registration process based rules defined by the system or enterprise.

Figure 4:
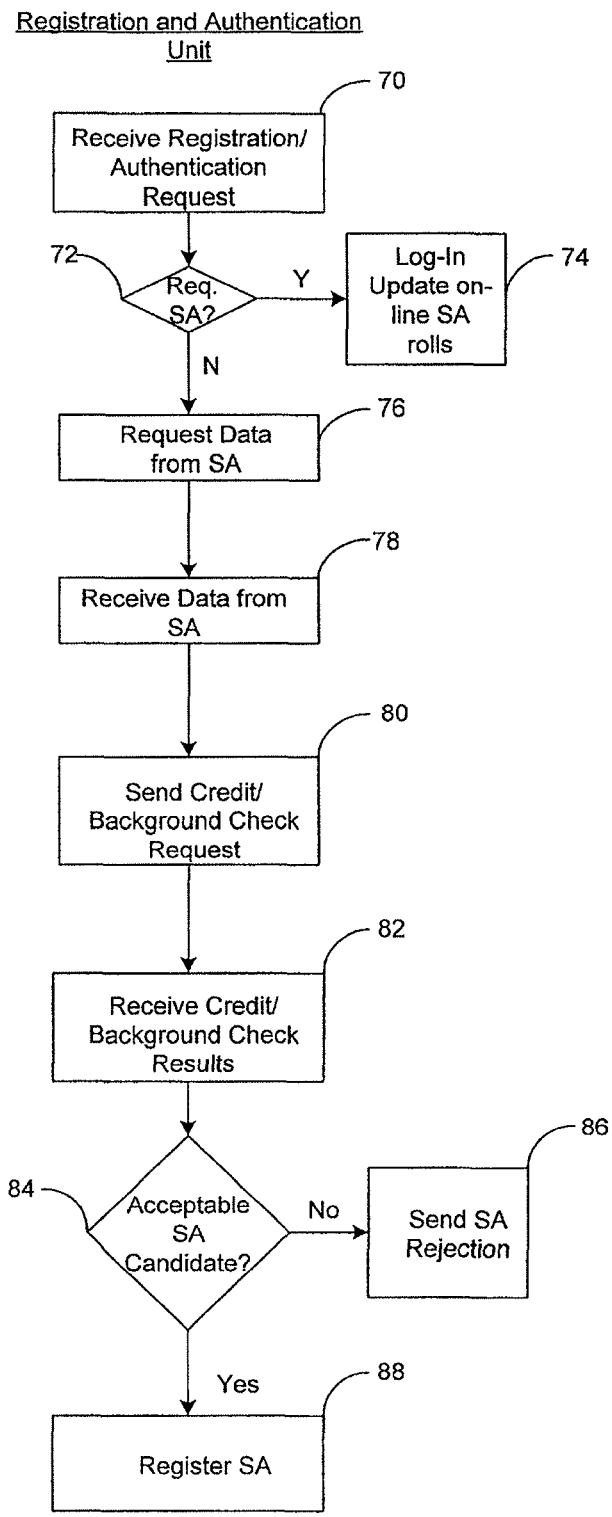
FIG. 4 is a flow diagram illustrating the training and accreditation process according to one embodiment of the present invention.

FIG. 4 illustrates a flow diagram of the training and accreditation process according to one embodiment of the invention. At 90, the Skills engine 218 receives a training or accreditation request from an SA. SAs may be accredited in terms of a merchandise category or a specific product or service. Accreditation standards can be created by the enterprise or the manufacturer, but in any event are published by the system. In response, at 92 the Skills engine 218 causes the appropriate materials to be provided to the SA. The materials can be provided to the SA online or can be sent to the SA offline. It is not necessarily objectionable that SAs could "cheat" the testing process by, for example, taking the test on an "open book" basis since they can also "cheat" in the same manner during the online sales experience. The materials could be established by the enterprises or by the manufacturers of certain products. The training materials contain the best practices information captured by the best practices engine 230 and enterprise supplied materials from the product data server 222. At 94, the Skills engine 218 receives and analyzes the results of the SA's training or accreditation and then at 95 the Skills engine 218 evaluates the observed performance metrics. At 96, the Skills engine 218 determines whether to accredit the SA. Then at 98, the Skills engine updates the SA records to indicate any new accreditation levels. Upon accreditation, the SA receives a "license" from the system or the enterprise to sell a specific good or service or category of goods or services. Licenses could also be granted on the basis of other categories as well, such as by geography, by demographic of the customer (reflected perhaps by customer login information or zip code information) or by any combination of the foregoing (e.g., by product and by demographic).

The testing and accreditation process can be performed online, manually, or a combination of both. The testing and accreditation process gives the system the ability to train and accredit SAs in order to effectively grant licenses to sell specific categories of products, goods, or services. Each enterprise can impose the training or certification level it desires before an SA will be permitted to sell at the enterprise's website.

Figure 5:
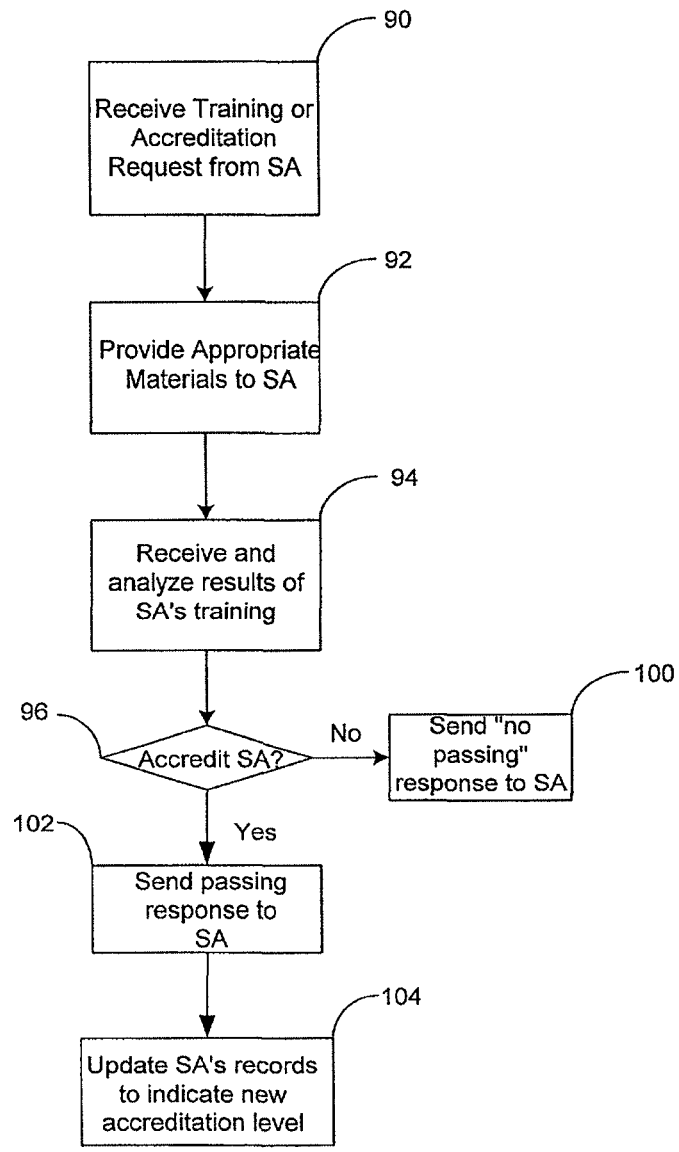
FIG. 5 is a flow diagram illustrating the matching process according to one embodiment of the present invention.

Turning now to FIG. 5, the matching functionality of the ExSACT matching engine 212 assures that the most qualified SA or SAs are matched to each browsing opportunity that meets "can" or "must" scenarios as defined by the matching engine. The following description of the matching functionality is provided in terms of a captive SA and enterprise or enterprise specific matching, but it is equally applicable to an independent SA selling the same product or set of products as an independent contractor on behalf of a variety of different enterprises.

At 500, the opportunity qualifier 204 identifies a browsing session that represents a sales opportunity (based on session information and, if available, customer information). The opportunity context server 204 sends the matching engine a request for SA assistance based on the nature of those parameters. At 502, the matching engine determines the applicable rule set to apply to the matching. The rule set is determined by the product or service the customer is interested in or other "triggers" established by the enterprise (for example, the enterprise could instruct the system to find a qualified sales associate whenever a mortgage calculator involving an original principal balance of $300,000 is engaged). The applicable rule set is determined from page-to-product mapping 504, enterprise specific product hierarchy 506, and matching rules 505. Page-to-product mapping 504 decodes the URL information from the session attributes to determine what product the customer is looking at. The page-to-product mapping 504 could be part of the opportunity qualifier 204 or could be separate. The enterprise-specific product hierarchy is then used to determine if the product the customer is interested in has a corresponding rule set. If the specific product does not have a rule set, then the lowest applicable rule set is determined from the hierarchy. The appropriate rule set is then selected from the matching rules 505.

Once the appropriate rule set 503 is determined, at 508 the matching engine evaluates all SAs against the rules of the chosen rule set. First, at 509, an unordered list of qualified SAs is produced. The matching is dynamically performed by weighing customer information, session information, and SA profile information according to the rule set, and each qualified SA is given a matching score. The SA profiles are continually updated by the system to provide the most current information for the ExACT matching engine. The matching score is based on the relative ranking of each SA within the bounds of a particular rule multiplied by the relative importance of that rule among all the rules for a particular rule set. At 510, the matching engine ranks the SAs based on the resulting matching scores. A list is generated of qualified SAs in rank order at 512. The list is then sent to the queue control at 513 and the queue control 513 ensures that a SA from the list is paired up with the customer.

Depending on the enterprise's preference, the matching engine matches the customer with an available SA with the highest matching score and alerts the SA that she must contact the customer, alerts qualified SAs at the top of the generated list that a customer needs assistance, or simply provides the SAs with their matching score and lets the SAs decide whether to contact the customer. With the second option, the SAs then "race" to the customer and the first SA to respond assists the customer. The SAs, in all scenarios, are notified through the desktop communication user interface, instant messaging, e-mail, telephone, wireless device, and/or any other applicable means and may be provided with their matching score. If the pool of available SAs is low, the matching application can cause SAs to be contacted via instant messaging, e-mail, telephone, wireless device, and/or any other applicable means to get online. Again, the SAs are contacted through a variety of means.

In one embodiment, the desktop 220 provides a simple user interface, for example, enterprise-facing web pages, to the ExSACT matching engine 212 for the enterprise to change the matching rules, introduce new rules, or reweigh existing rules for the matching engine. The matching engine also dynamically changes the matching rules based on various factors, such as sales successes or changing market conditions. Through this dynamic ranking feature, the matching engine produces "up-to-the-minute" opportunity matching based on criteria established by the enterprise and the success of the SA base in using the system.

Figure 6:
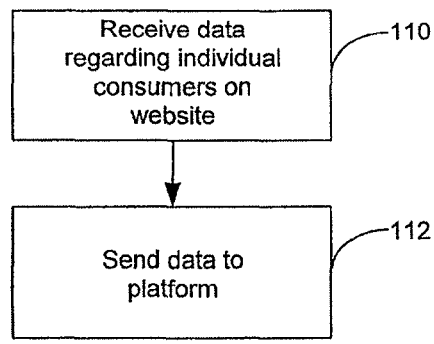
FIG. 6 is a screen shot of the Sales Office function of an SA user interface.

FIG. 6 illustrates a screen shot of the Sales Office section of the SA user interface. The Browsing Customers window 600 displays customers browsing for products that the SA is accredited to sell and that the matching application has matched the SA with. The SA can set the Browsing Customers window to display all customers looking at products, which the SA is accredited to sell, or just customers looking at specific products the SA is accredited to sell. SAs accredited to sell different products would see different views of the aggregate browsing activity at the enterprise's website. The Browsing Customers window 600 specifically displays, inter alia, the name of the customer, if this information is available, the SA's matching score for the customer, the number of clicks the customer has made, what the customer is currently viewing, and the amount of time the customer has been browsing.

The Inbox window 602 displays messages from customers along with the customers' names, type of message, and date received. The SA can create new messages or can reply to the customer's messages via the Inbox.

To the extent that data is available on the customers, the Customer Profile window 604 displays a list of these customers obtained from the customer data server 208. Basic information about the customer (such as address and phone number) is displayed and a menu of additional information, such as, relationship, correspondence, and personal notes, is displayed. By clicking on one of the menu items additional information is displayed in a More Detail window (not shown).

The top left hand side of the screen displays the various functions that are available to the SA at the Sales Office, for example, Daily Information, Browsing Customers, Product Resource Finder, Product Resource Library, Customer Profiles, and Inbox.

Figure 7:
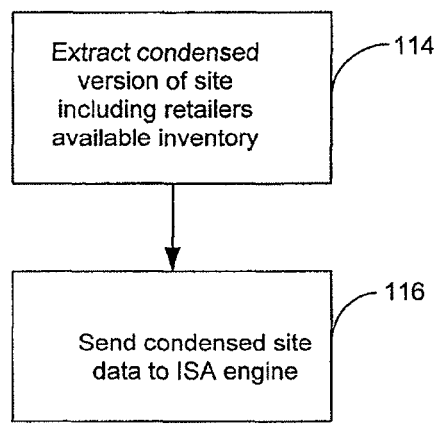
FIG. 7 is a screen shot of a Sales Floor function of the SA user interface.
Figure 8:
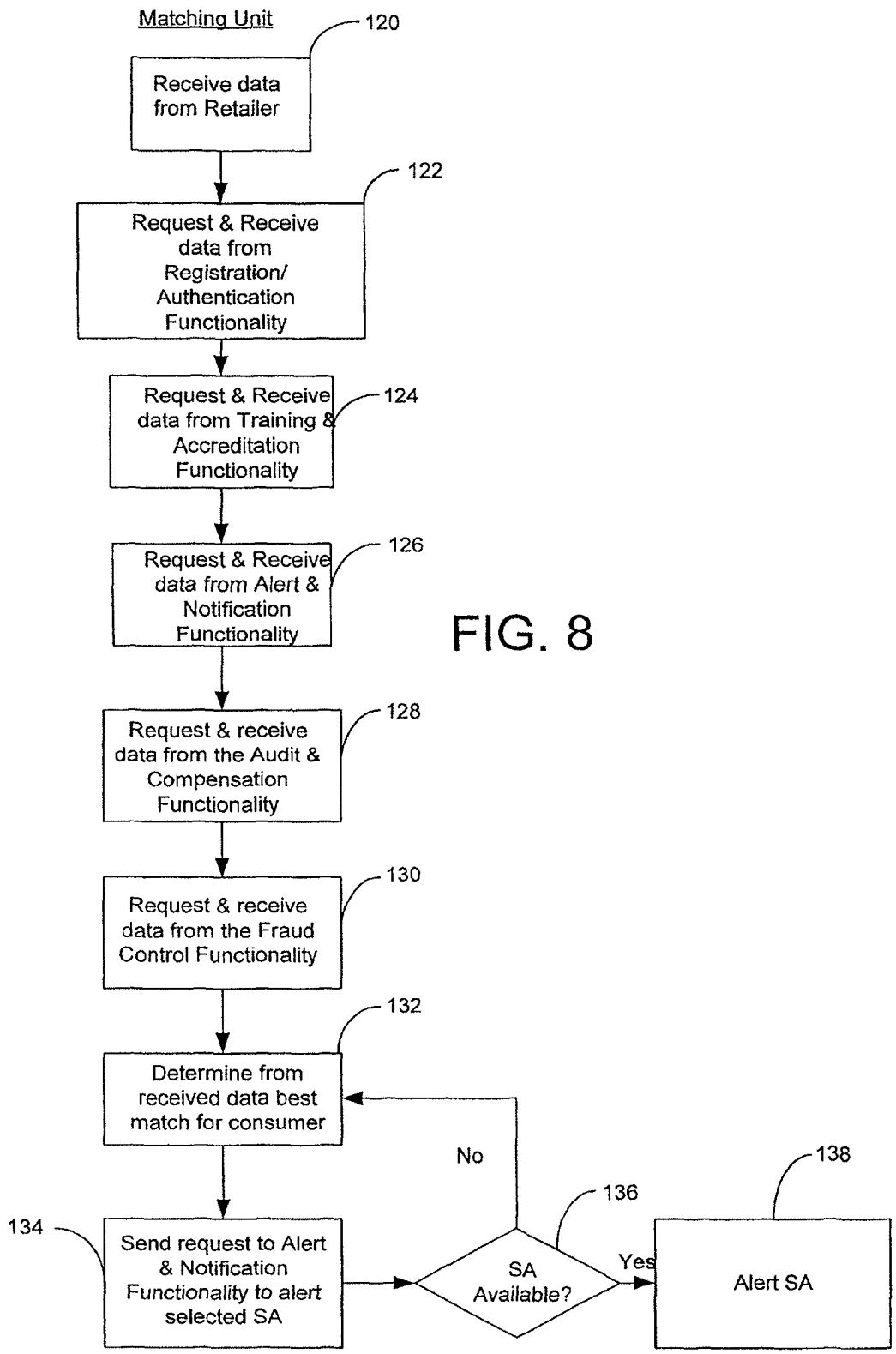
FIG. 8 is a further screen shot of the Sales Floor function of the SA user interface.

When an SA is linked with a customer, a Sales Floor screen is displayed on the SAs user interface as shown in FIGS. 7 and 8. The Sales Floor screen has a Session History window 700 that allows an SA to view the session history of the customer and view a current map of the customer in the website, the current flow of the customer, past maps, and past flows. A Customers Browser window 701 is also displayed on the Sales Floor screen that allows the SA to view what the customer is viewing. If allowed by the enterprise and/or the customer, an SA may manipulate and control the customer's browser and may 'whiteboard' on the pages the customer is viewing.

The Chat With Customer window 704 allows the SA to communicate with the customer. Instant messenger is the method of communication shown in the Customer Interaction window 704, as well as a list of commonly used phrases. The SA and customer can communicate via voice over IP, telephone, e-mail, or on a variety of applicable means. If the customer has the capability to receive a telephone call while connected to the Internet, the SA can connect to the customer via voice over IP or a telephone call over the PSTN through a bridge provided by the system. The customer can continue to view applicable web pages while conversing with the SA.

The Product Resource Finder 702 window allows the SA to select a particular product, for example, loans. The SA can, by clicking on a particular product, obtain additional product and catalog information concerning the product or service. The Product Resource Finder may also be used to assist the SA in identifying related products to be suggested as upsells or cross-sells. The SA can search for products or browse through categories of products. Information is provided to the Product Resource Finder window from the product database 224 via the content engine 208.

The Product Resource Library window 706 is used by the SA to access additional information about a particular product or service. In the example used in FIG. 8, the SA desires more information regarding mortgages. The Item Information window 706 provides the SA with best practices information from the practices engine 230. As explained above, the best practices information includes sales advice, external information, and product and catalog information, such as comparisons to other products, third party information regarding the product, sales pitches, related products, specific product information, warranty information, promotional information, shipping options, and terms of sale.

The Transaction Detail window 708 displays the customer's shopping cart to the SA. The SA, subject to the enterprise's and/or the customer's permission, can manipulate the customer's shopping cart.

FIG. 9 illustrates the Certification screen of the SA user interface. The Qualifications window 900 shows the SA the products and services that the SA is qualified to sell as well as the SAs rankings in her qualifications. The Certification Information window 902 provides the SA with information concerning the particular certifications available. The Certification detail window 904 provides the SA with an online test for certification.

FIG. 10 illustrates a flow diagram of the sales process using the system of the invention. At 1000, a customer enters a website. If the customer, is a returning customer of the website, the website greets the customer at 1002. The ExSACT matching engine 212 then matches the customer with a specific SA or several SAs. In step 1004, the SA greets the customer. This greeting is either re-active (if the customer has requested help) or pro-active (if the customer has not specifically requested sales assistance) depending on the customer's actions and the setup of the website. The SA evaluates the customer's intent at 1006 and determines whether the customer desires assistance at 1008. If the customer does not want assistance, the SA disengages at 1010.

If the customer does seek assistance, the SA then evaluates the customer's needs further through communication with the customer and accessing data on the customer at 1012. At this point, the SA determines the products, features, price range, user, and the customer's product knowledge. The SA then performs research at 1014 using the Product Resource Finder and Product Resource Library Information windows shown in FIG. 8 to access the best practices data. The SA directs the customer to specific products at 1016 and provides additional information as necessary to close the sale. The SA can use external (Web) assets as part of the experience, for example, the SA can take the customer to a competitor's website to show the customer the higher prices being charged by the competitor.

The SA evaluates whether the customer made a selection at 1018 and if so suggests related merchandise at 1022. The SA can then perform research at step 1014 on the related merchandise and then the process continues as before. If the customer did not make a selection, the SA further evaluates whether the customer is finished shopping at 1020. If the customer is not finished shopping, the SA evaluates the needs of the customer further at 1012 and the process continues as before. If the customer is finished shopping, the SA offers additional product information at 1024 and reinforces the customer's selection at 1026. The customer proceeds to the enterprise specific check out process at 1028. The SA can assist the customer at the check out process. At 1030, a satisfied customer leaves the website. The SA can follow up with the customer through the methods shown at the bottom of FIG. 10.

Figure 11:
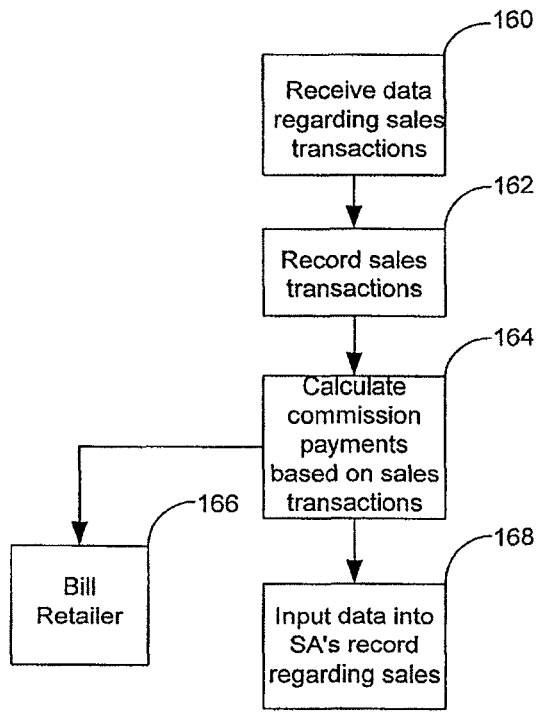
FIG. 11 is a flow diagram that reflects certain elements of the invention disclosed herein.

FIG. 11 is a flow diagram steps performed at an accounting unit. As depicted at 160, data is received regarding sales transactions. At 162, sales transactions are recorded. At 164, commission payments are calculated based on sales transactions. At 168, data is input into SA's record regarding sales. At 166, a bill retailer is provided with the calculations at 164.

Figure 12:
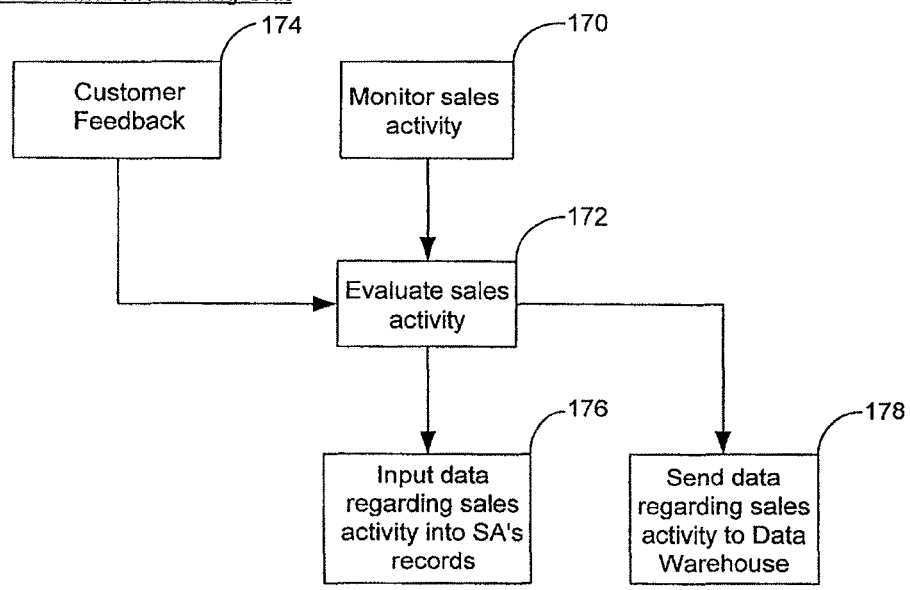
FIG. 12 is a flow diagram that reflects certain elements of the invention disclosed herein.

FIG. 12 is a flow diagram depicting operations performed at a real time monitoring unit. Sales activity is monitored at 170. Customer feedback is obtained, as shown at 174. Sales activity is evaluated at 172. At 176, data regarding sales activity is inputted into SA's records. At 178, data regarding sales activity is sent to a data warehouse.

Figure 13:
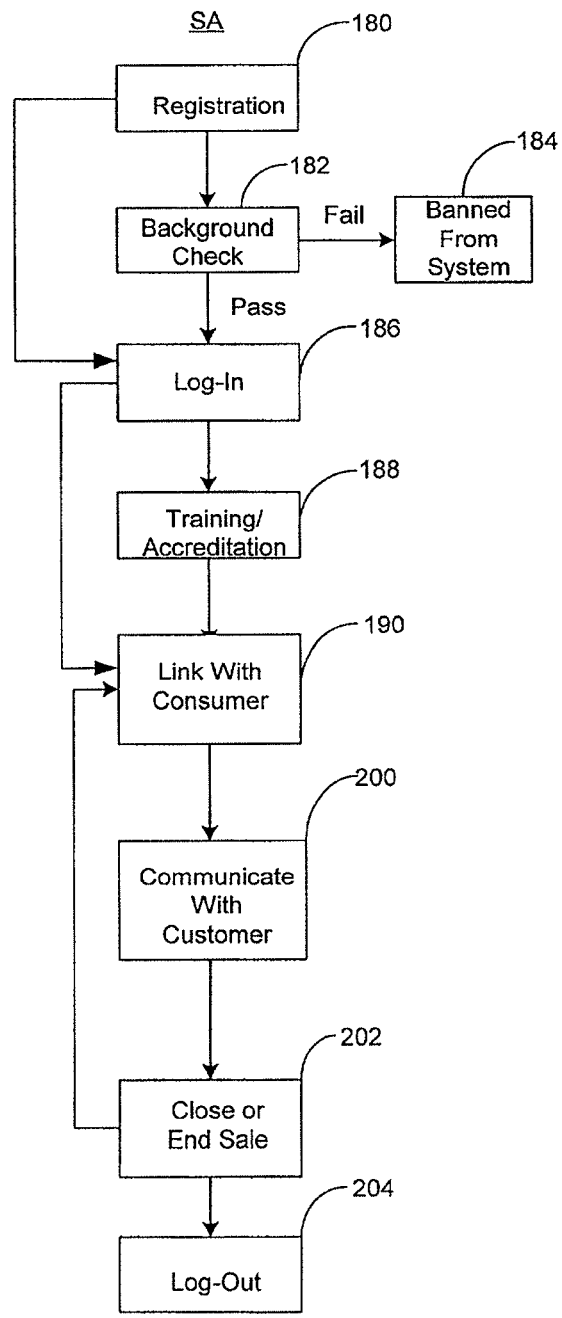
FIG. 13 is a flow diagram that reflects certain elements of the invention disclosed herein.

FIG. 13 indicates example operations involving a sales associate (SA) in accordance with the present disclosure. At 180, registration occurs. At 182, a background check 182 on the SA is conducted. If the SA fails the background check, the SA is banned from the system, as shown at 184. If the SA passes the background check at 182, a log-in is performed at 186. At 188, training and accreditation are provided. A link with a customer is formed at 190. At 200, communication with a customer occurs. At 202, a sale is either closed or ended. At 204, the SA performs a log-out.

The foregoing is provided in order to disclose the invention in accordance with the patent laws, and more particularly to disclose preferred embodiments of systems and processes according to the present invention. Modifications, adaptations, and changes may be made to what is disclosed without departing from the scope or spirit of the invention, which is to provide systems and processes to facilitate selling on, over, through or in conjunction with the online channel.

What is claimed is:
1. A system, comprising:
   one or more data processors; and
   a non-transitory computer-readable storage medium containing instructions which when executed on the one or more data processors, cause the one or more processors to perform operations including:

receiving a session information message, wherein the session information message includes session information representing an interaction between a website and a network device;
retrieving customer information associated with the session information;
using the session information and the customer information to determine whether the interaction constitutes an opportunity;
accessing a database of matching criteria, wherein the database of matching criteria includes one or more rules and profile information associated with one or more agent devices;
selecting a rule, wherein a rule has an associated weight, and wherein a rule is selected using session information and customer information;
evaluating the rule against a set of agent devices, wherein evaluating the rule includes comparing the rule with profile information associated with each agent device of the set of agent devices;
determining a subset of qualified agent devices from the set of agent devices, wherein a qualified agent device is associated with profile information that satisfies the rule;
determining matching scores for the subset of qualified agent devices, wherein determining a matching score includes evaluating the rule using profile information associated with the qualified agent devices, the session information, and the customer information to generate a score, and multiplying the score by the associated weight of the rule;
generating a ranking of the qualified agent devices using the matching scores;
using the ranking to select an agent device from the subset of qualified agent devices;
facilitating a chat communication session between the network device and the agent device, wherein the chat communication session is bridged from the chat communication session to a telephonic conference call;
determining an outcome associated with the chat communication session; and
dynamically optimizing the ranking of the qualified agent devices by using the outcome to update the matching criteria in the database in real-time, wherein the dynamic optimization of the ranking improves agent selection.

2. The system of claim 1, wherein the session information includes information about a product available through the website.

3. The system of claim 1, wherein the operations further include transmitting a notification message when the interaction constitutes the opportunity, wherein the notification message, when received, generates a prompt for initiating an engagement, and wherein facilitating the chat communication session is performed based on initiating the engagement.

4. The system of claim 1, wherein selecting the rule includes using product information contained within the session information.

5. The system of claim 1, wherein the operations further include extracting customer identification information from the session information, wherein retrieving customer information includes accessing a database using the customer identification information to retrieve the customer information.

6. The system of claim 1, wherein retrieving customer information includes extracting the customer information from the session information.

7. A computer-implemented method, comprising:
receiving a session information message, wherein the session information message includes session information representing an interaction between a website and a network device;
retrieving customer information associated with the session information;
using the session information and the customer information to determine whether the interaction constitutes an opportunity;
accessing a database of matching criteria, wherein the database of matching criteria includes one or more rules and profile information associated with one or more agent devices;
selecting a rule, wherein a rule has an associated weight, and wherein a rule is selected using session information and customer information;
evaluating the rule against a set of agent devices, wherein evaluating the rule includes comparing the rule with profile information associated with each agent device of the set of agent devices;
determining a subset of qualified agent devices from the set of agent devices, wherein a qualified agent device is associated with profile information that satisfies the rule;
determining matching scores for the subset of qualified agent devices, wherein determining a matching score includes evaluating the rule using profile information associated with the qualified agent devices, the session information, and the customer information to generate a score, and multiplying the score by the associated weight of the rule;
generating a ranking of the qualified agent devices using the matching scores;
using the ranking to select an agent device from the subset of qualified agent devices;
facilitating a chat communication session between the network device and the agent device, wherein the chat communication session is bridged from the chat communication session to a telephonic conference call;
determining an outcome associated with the chat communication session; and
dynamically optimizing the ranking of the qualified agent devices by using the outcome to update the matching criteria in the database in real-time, wherein the dynamic optimization of the ranking improves agent selection.

8. The method of claim 7, wherein the session information includes information about a product available through the website.

9. The method of claim 7, further including transmitting a notification message when the interaction constitutes the opportunity, wherein the notification message, when received, generates a prompt for initiating an engagement, and wherein facilitating the chat communication session is performed based on initiating the engagement.

10. The method of claim 7, wherein selecting accessing the rule includes using product information contained within the session information.

11. The method of claim 7, further including extracting customer identification information from the session information, wherein retrieving customer information includes accessing a database using the customer identification information to retrieve the customer information.

12. The method of claim 7, wherein retrieving customer information includes extracting the customer information from the session information.

13. A computer-program product tangibly embodied in a non-transitory machine-readable storage medium, including instructions configured to cause a data processing apparatus to perform operations including:
- receiving a session information message, wherein the session information message includes session information representing an interaction between a website and a network device;
- retrieving customer information associated with the session information;
- using the session information and the customer information to determine whether the interaction constitutes an opportunity;
- accessing a database of matching criteria, wherein the database of matching criteria includes one or more rules and profile information associated with one or more agent devices;
- selecting a rule, wherein a rule has an associated weight, and wherein a rule is selected using session information and customer information;
- evaluating the rule against a set of agent devices, wherein evaluating the rule includes comparing the rule with profile information associated with each agent device of the set of agent devices;
- determining a subset of qualified agent devices from the set of agent devices, wherein a qualified agent device is associated with profile information that satisfies the rule;
- determining matching scores for the subset of qualified agent devices, wherein determining a matching score includes evaluating the rule using profile information associated with the qualified agent devices, the session information, and the customer information to generate a score, and multiplying the score by the associated weight of the rule;
- generating a ranking of the qualified agent devices using the matching scores;
- using the ranking to select an agent device from the subset of qualified agent devices;
- facilitating a chat communication session between the network device and the agent device, wherein the chat communication session is bridged from the chat communication session to a telephonic conference call;
- determining an outcome associated with the chat communication session; and
- dynamically optimizing the ranking of the qualified agent devices by using the outcome to update the matching criteria in the database in real-time, wherein the dynamic optimization of the ranking improves agent selection.

14. The computer-program product of claim 13, wherein the session information includes information about a product available through the website.

15. The computer-program product of claim 13, wherein the operations further include transmitting a notification message when the interaction constitutes the opportunity, wherein the notification message, when received, generates a prompt for initiating an engagement, and wherein facilitating the chat communication session is performed based on initiating the engagement.

16. The computer-program product of claim 13, wherein selecting accessing the rule includes using product information contained within the session information.

17. The computer-program product of claim 13, wherein the operations further include extracting customer identification information from the session information, wherein retrieving customer information includes accessing a database using the customer identification information to retrieve the customer information.

18. The computer-program product of claim 13, wherein retrieving customer information includes extracting the customer information from the session information.

19. The system of claim 1, wherein an identification of each of the qualified agent devices is transmitted to a queue control, wherein the queue control ensures that the selected agent device initiates an engagement with the network device.

* * * * *